(12) United States Patent
Huang et al.

(10) Patent No.: US 11,297,000 B2
(45) Date of Patent: Apr. 5, 2022

(54) DATA TRANSMISSION METHOD, APPARATUS, AND SYSTEM

(71) Applicant: HUAWEI TECHNOLOGIES CO., LTD., Guangdong (CN)

(72) Inventors: Jing Huang, Shenzhen (CN); Xiaojun Zhang, Shenzhen (CN); Rixin Li, Shenzhen (CN); Zhigang Zhu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/832,795

(22) Filed: Mar. 27, 2020

(65) Prior Publication Data
US 2020/0228458 A1 Jul. 16, 2020

Related U.S. Application Data

(63) Continuation of application No. PCT/CN2018/104193, filed on Sep. 5, 2018.

(30) Foreign Application Priority Data
Sep. 28, 2017 (CN) .......................... 201710898393.6

(51) Int. Cl.
*H04L 12/24* (2006.01)
*H04L 47/74* (2022.01)
*H04L 41/0668* (2022.01)

(52) U.S. Cl.
CPC .......... *H04L 47/74* (2013.01); *H04L 41/0668* (2013.01)

(58) Field of Classification Search
CPC ....... H04L 47/74; H04L 41/0668; H04L 5/00; H04L 5/0044; H04J 2203/0085;
(Continued)

(56) References Cited

U.S. PATENT DOCUMENTS 10,623,327 B2 * 4/2020 Wu ........................ H04L 1/0008
10,951,512 B2 * 3/2021 Zhong ................... H04L 45/125
(Continued)

FOREIGN PATENT DOCUMENTS

CN 102833089 A 12/2012
CN 106612203 A 5/2017
(Continued)

OTHER PUBLICATIONS

Xinyuan Wang Huawei Technologies China: "Interconnection with Packet Transport Network using Flex Ethernet;wd091014-05", ITU-T Draft; Study Period 2017-2020; Study Group 15; Series WD091014-05, International Telecommunication Union, Geneva; CH, vol. 10/15 Apr. 6, 2017 (Apr. 6, 2017), pp. 1-19, XP044229479.
(Continued)

*Primary Examiner* — Jay P Patel
(74) *Attorney, Agent, or Firm* — Womble Bond Dickinson (US) LLP

(57) ABSTRACT

This disclosure relates to a data transmission method, apparatus, and system, and belongs to the field of communications technologies. The data transmission method includes: obtaining, by a first node, m ($^{m \geq 2}$) first FlexE clients, mapping the m first FlexE clients to one second FlexE client, and transmitting data of the second FlexE client to a second node, where data of each first FlexE client occupies a fixed timeslot of the second FlexE client, and the second node is different from the first node. In this disclosure, a problem in a related technology that a relatively fine granularity of a FlexE client imposes a relatively strict requirement on data processing performance of a node is resolved, and a plurality of first FlexE clients are mapped to one second FlexE client.

18 Claims, 18 Drawing Sheets

(58) Field of Classification Search
CPC . H04J 3/1658; H04W 72/12; H04W 72/1221; H04W 72/1263
See application file for complete search history.

(56) References Cited

U.S. PATENT DOCUMENTS

| | | |
|---|---|---|
| 2011/0305136 A1 | 12/2011 | Pan et al. |
| 2017/0005901 A1* | 1/2017 | Gareau ................. H04L 43/10 |
| 2018/0183538 A1* | 6/2018 | Chen ................... H04L 47/525 |
| 2019/0173856 A1* | 6/2019 | Gareau ................ H04L 1/0061 |
| 2019/0288783 A1* | 9/2019 | Zhong .................. H04L 1/0008 |
| 2019/0342022 A1* | 11/2019 | Zhou .................... H04J 3/0632 |
| 2019/0349311 A1* | 11/2019 | Ji ............................ H04L 47/32 |
| 2020/0236058 A1* | 7/2020 | Wu .......................... H04L 1/00 |

FOREIGN PATENT DOCUMENTS

| | | | |
|---|---|---|---|
| CN | 106612220 A | 5/2017 | |
| CN | 106803814 A | 6/2017 | |
| CN | 106850465 A | 6/2017 | |
| CN | 107204941 A | 9/2017 | |
| CN | 3531594 B1 * | 4/2021 | ............... H04J 3/07 |
| WO | 2012171397 A1 | 12/2012 | |
| WO | 2017121158 A1 | 7/2017 | |

OTHER PUBLICATIONS

A# Oif: "IA OIF-FLEXE-01.1, Flex Ethernet Implementation Agreement", Jun. 21, 2017 (Jun. 21, 2017), total 35 pages. XP055703030.
ITU-T G.709/Y.1331, Interfaces for the optical transport network Corrigendum 1, (Aug. 2017), Aug. 2017. total 248 pages.

* cited by examiner

| K1 | K2 | K3 | K4 | K5 | K6 | K7 | K8 | K9 | K10 |

DATA TRANSMISSION METHOD, APPARATUS, AND SYSTEM

CROSS-REFERENCE TO RELATED APPLICATIONS

This application is a continuation of International Application No. PCT/CN2018/104193, filed on Sep. 5, 2018, which claims priority to Chinese Patent Application No. 201710898393.6, filed on Sep. 28, 2017, The disclosures of the aforementioned applications are hereby incorporated by reference in their entireties.

TECHNICAL FIELD

This disclosure relates to the field of communications technologies, and in particular, to a data transmission method, apparatus, and system.

BACKGROUND

A flexible Ethernet (FlexE) technology is a new interface technology used for data transmission. The technology provides a common mechanism to support data transmission of various existing Ethernet (Ethernet) Media Access Control (MAC, Media Access Control) signal rates, and these Ethernet MAC signal rates may be different from any existing Ethernet physical layer (PHY) rate.

Currently, in the flexible Ethernet technology, K ($1 \leq K \leq 254$) physical interfaces having 100G time domain resources on one node are bound into one FlexE group. A time domain resource of each physical interface is divided into 20 5G timeslots, and one FlexE group is corresponding to 20×K timeslots. The 20×K timeslots are classified into a plurality of groups, one FlexE client is corresponding to one group of timeslots, and one FlexE client is one data flow.

However, the node transmits all data at a granularity of one FlexE client in the FlexE technology. Because the granularity of one FlexE client is relatively fine, if the node processes all the data at a granularity of one FlexE client, a requirement for data processing performance of the node is relatively strict.

SUMMARY

This disclosure provides a data transmission method, apparatus, and system, so as to resolve a problem in a related technology that a relatively fine granularity of a FlexE client imposes a relatively strict requirement on data processing performance of a node. The technical solutions are as follows:

According to one embodiment, a data transmission method is provided, where the method is applied to a first node, and the method includes: obtaining, by a first node, m (m≥2) first FlexE clients, mapping the m first FlexE clients to one second FlexE client, and transmitting data of the second FlexE client to a second node, where data of each first FlexE client occupies a fixed timeslot of the second FlexE client, and the second node is different from the first node.

In this disclosure, the first node can map the plurality of obtained first FlexE clients to one second FlexE client, and transmit the data of the second FlexE client to the second node, and the data of each first FlexE client occupies the fixed timeslot of the second FlexE client. It is assumed that there are totally five timeslots of the second FlexE client, and timeslot identifiers of the five timeslots are respectively ST1, ST2, ST3, ST4, and ST5. The first node obtains two first FlexE clients: a first FlexE client YL1 and a first FlexE client YL2. After the first node maps the two first FlexE clients to one second FlexE client, data of the first FlexE client YL1 occupies timeslots of the second FlexE client whose timeslot identifiers are ST1 and ST2, and data of the first FlexE client YL2 occupies timeslots of the second FlexE client whose timeslot identifiers are ST3, ST4, and ST5. In a subsequent transmission process, the data of the first FlexE client YL1 always occupies the timeslots whose timeslot identifiers are ST1 and ST2, the data of the first FlexE client YL2 always occupies the timeslots whose timeslot identifiers are ST3, ST4, and ST5, and the timeslots of the second FlexE client that are occupied by the data of the first FlexE client YL1 and the timeslots of the second FlexE client that are occupied by the data of the first FlexE client YL2 remain unchanged, so as to facilitate data recovery. According to the method, the plurality of first FlexE clients are mapped to one second FlexE client, so that the node does not need to process all data at a granularity of one FlexE client, thereby reducing a requirement for data processing performance of the node.

Optionally, the mapping the m first FlexE clients to one second FlexE client may include: mapping a data code block in the data of each of the m first FlexE clients to a specified timeslot of the second FlexE client, to obtain a data code block flow of the second FlexE client; and continuously adding N idle code blocks to the data code block flow of the second FlexE client, where N is an integer multiple of a quantity of timeslots of the second FlexE client.

When continuously adding the N idle code blocks to the data code block flow of the second FlexE client, the first node may continuously add the N idle code blocks at any location of the data code block flow of the second FlexE client.

In this disclosure, the first node continuously adds the N idle code blocks to the data code block flow of the second FlexE client, and N is the integer multiple of the quantity of timeslots of the second FlexE client. Therefore, there are (N/1) idle code blocks in each of timeslots of the second FlexE client, and 1 is the quantity of timeslots of the second FlexE client. In this way, it can be ensured that the data of each first FlexE client occupies the fixed timeslot of the second FlexE client, in other words, the timeslot of the second FlexE client that is occupied by the data of each first FlexE client in a transmission process remains unchanged, so as to facilitate data recovery.

Optionally, the mapping a data code block in the data of each of the m first FlexE clients to a specified timeslot of the second FlexE client includes: sorting the m first FlexE clients in a preset sorting manner; and mapping the data code block in the data of each of the m first FlexE clients to the specified timeslot of the second FlexE client in a sorting order. The data code block in the data of each first FlexE client is mapped to the specified timeslot of the second FlexE client in the sorting order, so as to improve data code block mapping efficiency.

Optionally, the sorting the m first FlexE clients in a preset sorting manner includes: sorting the m first FlexE clients based on content of a flow label corresponding to each of the m first FlexE clients.

In this disclosure, information included in the flow label corresponding to the first FlexE client may be represented in a plurality of manners.

In a first manner, the flow label of the first FlexE client with which the first node is provided may include node identifiers of all nodes configured to transmit the data of the first FlexE client, and information about a relationship between any two neighboring nodes configured to transmit the data of the first FlexE client. The information about the relationship between two neighboring nodes may include a group identifier of a FlexE group to which the first FlexE client belongs on a node configured to send the data of the first FlexE client, a flow identifier of the first FlexE client, and information about a timeslot occupied by the data of the first FlexE client. Different pairs of neighboring nodes are provided with different flow identifiers of the first FlexE client.

When a quantity of nodes is relatively large, to reduce storage space required by the flow label of the first FlexE client, in a second manner, the flow label of the first FlexE client with which the first node is provided may include an ingress node of the first FlexE client, an egress node of the first FlexE client, and information about a relationship between any two neighboring nodes configured to transmit the data of the first FlexE client.

To simplify the information in the flow label of the first FlexE client, in a third manner, the flow label of the first FlexE client with which the first node is provided may include an ingress node of the first FlexE client, an egress node of the first FlexE client, a flow identifier of the first FlexE client, and a group identifier of a FlexE group to which the first FlexE client belongs on a node that is in any two neighboring nodes and that is configured to send the data of the first FlexE client.

To further simplify the information in the flow label of the first FlexE client, in a fourth manner, the flow label of the first FlexE client with which the first node is provided may include an ingress node of the first FlexE client, an egress node of the first FlexE client, and a flow identifier of the first FlexE client. Different nodes are provided with a same flow identifier of the first FlexE client.

Optionally, before the mapping a data code block in the data of each of the m first FlexE clients to a specified timeslot of the second FlexE client, the method may further include: deleting q idle code blocks from data of p first FlexE clients, where $1 \leq p \leq m$ and $q \geq 1$.

In this disclosure, to meet a requirement for a data transmission rate between nodes, before mapping the m first FlexE clients to one second FlexE client, the first node may preprocess the data of the p ($1 \leq p \leq m$) first FlexE clients. For example, the first node may delete some redundant idle code blocks from the data of the p first FlexE clients, so that the first node can subsequently continuously add a plurality of idle code blocks to a data code block flow of the second FlexE client. The plurality of continuously added idle code blocks are used to ensure that the data of the first FlexE client occupies the fixed timeslot of the second FlexE client.

Optionally, the transmitting, by the first node, data of the second FlexE client to a second node may include: sending, by the first node, the data of the second FlexE client to a third node; when detecting that there are N continuous idle code blocks in a data code block flow of the second FlexE client, deleting, by the third node, the N idle code blocks, where the third node is a node between the first node and the second node when the data of the second FlexE client is transmitted; and when transmitting a processed second FlexE client to the second node, continuously adding, by the third node, the N idle code blocks to a data code flow of the processed second FlexE client.

The idle code block addition operation performed by the third node and the idle code block addition operation performed by the first node may be the same, or may be different. For example, to ensure normal data transmission and complete rate matching, the third node may add or delete some idle code blocks based on an actual requirement.

Optionally, the first node and the second node are nodes in a FlexE ring network, the FlexE ring network includes a plurality of nodes, the plurality of nodes form a working path and a protection path, both the working path and the protection path are two-way transmission paths, the first FlexE client is a working FlexE client, and the second FlexE client is a protection FlexE client; and correspondingly, the obtaining m first FlexE clients may include: when it is detected that an element closest to the first node on the working path is faulty, obtaining the m working FlexE clients that are to be sent to a next node on the working path, where the element is a node or a link.

Optionally, the transmitting data of the second FlexE client to a second node includes: transmitting the data of the protection FlexE client to the second node along the protection path, where the second node is a node close to the faulty element.

In this disclosure, when the first node detects that the element closest to the first node on the working path in the FlexE ring network is faulty, the first node can map the m working FlexE clients that are to be sent to the next node on the working path to one protection FlexE client, and the data of each working FlexE client occupies the fixed timeslot of the protection FlexE client. Then, the first node transmits the data of the protection FlexE client to the second node along the protection path in the FlexE ring network, and the second node is the node close to the faulty element. In this process, a requirement for data processing performance of the node is reduced, and service interrupt occurring when the working path is faulty is avoided, so as to improve data transmission reliability, and provide a reliable ring network protection mode for a FlexE technology.

Optionally, the first node and the second node are nodes in a FlexE-based hierarchical network. According to the data transmission method, the plurality of first FlexE clients are mapped to one second FlexE client, and multi-level mapping is performed on the FlexE client, so that the node does not need to process all data at a granularity of one FlexE client, thereby reducing a quantity of fine-grained FlexE clients that should be processed by the node, reducing a requirement for data processing performance of the node, and constructing a hierarchical large-scale network.

Optionally, when $m \geq 3$, the first node may perform a plurality of mapping operations; and correspondingly, the mapping, by the first node, the m first FlexE clients to one second FlexE client may include: performing, by the first node, a plurality of mapping operations on the m first FlexE clients, to map the m first FlexE clients to one second FlexE client. For example, the first node may perform the plurality of mapping operations on the m first FlexE clients in a grouping—first mapping—second manner.

When the first node and the second node are the nodes in the FlexE-based hierarchical network, optionally, a flow label corresponding to the first FlexE client may include a flow identifier of the first FlexE client and a size of the data of the first FlexE client. Different nodes are provided with a same flow identifier of the first FlexE client.

According to one embodiment, a data transmission method is provided, where the method is applied to a second node, and the method includes: receiving, by the second node, data of a second FlexE client that is transmitted by a first node, where the second FlexE client is obtained after the first node maps m obtained first FlexE clients, data of each first FlexE client occupies a fixed timeslot of the second FlexE client, the first node is different from the second node, and m≥2; and performing, by the second node, a forwarding operation or a recovery operation on the data of the second FlexE client.

According to the method, the plurality of first FlexE clients are mapped to one second FlexE client, so that the node does not need to process all data at a granularity of one FlexE client, thereby reducing a requirement for data processing performance of the node.

Optionally, the first node and the second node are nodes in a FlexE ring network, the FlexE ring network includes a plurality of nodes, the plurality of nodes form a working path and a protection path, both the working path and the protection path are two-way transmission paths, the first FlexE client is a working FlexE client, and the second FlexE client is a protection FlexE client;

correspondingly, the receiving data of a second FlexE client that is transmitted by a first node may include: receiving the data of the protection FlexE client that is transmitted by the first node along the protection path, where the protection FlexE client is obtained after the first node maps the m working FlexE clients that are to be sent to a next node on the working path when detecting that an element closest to the first node on the working path is faulty, and the element is a node or a link;

the performing a forwarding operation or a recovery operation on the data of the second FlexE client includes: recovering the m working FlexE clients from the protection FlexE client; and after the recovering the protection FlexE client to the m working FlexE clients, the method may further include: performing a target operation on the data of each of the m working FlexE clients, where the target operation is a forwarding operation or a discarding operation.

Optionally, the recovering the m working FlexE clients from the protection FlexE client may include: when it is detected that there are N continuous idle code blocks in a data code block flow of the protection FlexE client, deleting the N idle code blocks, where N is an integer multiple of a quantity of timeslots of the protection FlexE client; and recovering the m working FlexE clients based on a location of a data code block in the data of each working FlexE client.

In this disclosure, when the first node detects that the element closest to the first node on the working path in the FlexE ring network is faulty, the first node maps the m working FlexE clients that are to be sent to the next node on the working path to one protection FlexE client, and the data of each working FlexE client occupies the fixed timeslot of the protection FlexE client. Then, the first node transmits the data of the protection FlexE client to the second node along the protection path in the FlexE ring network, and the second node is the node close to the faulty element. The second node receives the data of the protection FlexE client that is transmitted by the first node, recovers the m working FlexE clients from the protection FlexE client, and performs a forwarding operation or a discarding operation on the data of each of the m working FlexE clients. In this process, a requirement for data processing performance of the node is reduced, and service interrupt occurring when the working path is faulty is avoided, so as to improve data transmission reliability, and provide a reliable ring network protection mode for a FlexE technology.

Optionally, the performing a target operation on the data of each of the m working FlexE clients includes: for each of the working FlexE clients: when it is detected, based on a flow label corresponding to the working FlexE client, that the data of the working FlexE client does not pass through the second node, performing the discarding operation on the data of the working FlexE client; or when it is detected, based on a flow label corresponding to the working FlexE client, that the data of the working FlexE client passes through the second node, performing the forwarding operation on the data of the working FlexE client, where the flow label corresponding to the working FlexE client is used to indicate a forwarding path of the data of the working FlexE client on the working path.

To simplify information in the flow label of the first FlexE client, the flow label corresponding to the working FlexE client may include an ingress node of the working FlexE client, an egress node of the working FlexE client, a flow identifier of the working FlexE client. Different nodes are provided with a same flow identifier of the working FlexE client.

Optionally, the first node and the second node are nodes in a FlexE-based hierarchical network; correspondingly, the performing a forwarding operation or a recovery operation on the data of the second FlexE client includes: performing the forwarding operation on the data of the second FlexE client; and the performing a forwarding operation on the data of the second FlexE client may include: mapping, to a third FlexE client, the second FlexE client and another received second FlexE client transmitted by another node, where the another second FlexE client is obtained after the another node maps the m obtained first FlexE clients, and the data of the second FlexE client and data of the another second FlexE client each occupy a fixed timeslot of the third FlexE client; and transmitting data of the third FlexE client to a next node.

Further, after the next node receives the data of the third FlexE client that is transmitted by the second node, when the next node should recover a plurality of second FlexE clients from the third FlexE client, the next node may recover the plurality of second FlexE clients based on a size of data of the second FlexE clients and a sequence in which the second FlexE clients are mapped to the third FlexE client. The next node may obtain the size of the data of the second FlexE clients based on the flow label that is corresponding to the first FlexE client and with which the next node is provided. For example, the flow label corresponding to the first FlexE client includes a flow identifier of the first FlexE client and a size of the data of the first FlexE client.

According to the data transmission method, the plurality of first FlexE clients are mapped to one second FlexE client, and multi-level mapping is performed on the FlexE client, so that the node does not need to process all data at a granularity of one FlexE client, thereby reducing a quantity of fine-grained FlexE clients that should be processed by the node, reducing a requirement for data processing performance of the node, and constructing a hierarchical large-scale network.

According to one embodiment, a data transmission apparatus is provided, and is applied to a first node, where the data transmission apparatus includes at least one module, and the at least one module is configured to implement the data transmission method according to the first aspect.

According to one embodiment, a data transmission apparatus is provided, and is applied to a second node, where the data transmission apparatus includes at least one module, and the at least one module is configured to implement the data transmission method according to the second aspect.

According to one embodiment, a data transmission apparatus is provided, and is applied to a first node, where the data transmission apparatus includes a processor, a memory, a network interface, and a bus. The bus is configured to connect the processor, the memory, and the network interface. The network interface is configured to implement a communicative connection between the first node and another node. The processor is configured to execute a program stored in the memory, to implement the data transmission method according to the first aspect.

According to one embodiment, a computer readable storage medium is provided, where the computer readable storage medium stores an instruction, and when the computer readable storage medium runs on a computer, the computer performs the data transmission method according to the first aspect.

According to one embodiment, a computer program product including an instruction is provided, where when the computer program product is run on a computer, the computer performs the data transmission method according to the first aspect.

According to one embodiment, a data transmission apparatus is provided, and is applied to a second node, where the data transmission apparatus includes a processor, a memory, a network interface, and a bus. The bus is configured to connect the processor, the memory, and the network interface. The network interface is configured to implement a communicative connection between the second node and another node. The processor is configured to execute a program stored in the memory, to implement the data transmission method according to the second aspect.

According to one embodiment, a computer readable storage medium is provided, where the computer readable storage medium stores an instruction, and when the computer readable storage medium runs on a computer, the computer performs the data transmission method according to the second aspect.

According to one embodiment, a computer program product including an instruction is provided, where when the computer program product is run on a computer, the computer performs the data transmission method according to the second aspect.

According to one embodiment, a data transmission system is provided, and includes a first node and a second node.

The first node includes the data transmission apparatus according to the third aspect, and the second node includes the data transmission apparatus according to the fourth aspect.

Alternatively, the first node includes the data transmission apparatus according to the fifth aspect, and the second node includes the data transmission apparatus according to the eighth aspect.

Technical effects obtained in the third aspect, the fifth aspect, the sixth aspect, and the seventh aspect are similar to technical effects obtained by using corresponding technical means in the first aspect. Details are not described herein again.

Technical effects obtained in the fourth aspect, the eighth aspect, the ninth aspect, and the tenth aspect are similar to technical effects obtained by using corresponding technical means in the second aspect. Details are not described herein again.

The technical solutions provided in this disclosure bring the following beneficial effects:

The first node can map the plurality of obtained first FlexE clients to one second FlexE client, and transmit the data of the second FlexE client to the second node, the second node is different from the first node, and the data of each first FlexE client occupies the fixed timeslot of the second FlexE client, so that the node does not need to process all data at a granularity of one FlexE client, thereby reducing a quantity of fine-grained FlexE clients that should be processed by the node, and reducing a requirement for data processing performance of the node.

BRIEF DESCRIPTION OF DRAWINGS

FIG. 1-2 is a schematic diagram of a FlexE ring network according to an embodiment of the present disclosure.

FIG. 1-3 is a schematic diagram of a FlexE-based hierarchical network according to an embodiment of the present disclosure.

FIG. 2-1 is a flowchart of a data transmission method according to an embodiment of the present disclosure.

FIG. 2-2A and FIG. 2-2B are a schematic diagram of transmitting data of a first FlexE client by a node in a related technology.

FIG. 2-3 is a flowchart of mapping m first FlexE clients to one second FlexE client according to an embodiment of the present disclosure.

FIG. 2-4 is a flowchart of mapping a data code block in data of each first FlexE client to a specified timeslot of a second FlexE client according to an embodiment of the present disclosure.

FIG. 2-5 is a schematic diagram of a flow label of a first FlexE client with which a first node is provided according to an embodiment of the present disclosure.

FIG. 2-6 is a schematic diagram of a data code block flow of a second FlexE client according to an embodiment of the present disclosure.

FIG. 2-7 is a flowchart of transmitting data of a second FlexE client according to an embodiment of the present disclosure.

FIG. 2-8A and FIG. 2-8B are a schematic diagram of sending data of a second FlexE client by a first node according to an embodiment of the present disclosure.

FIG. 2-9 is another schematic diagram of sending data of a second FlexE client by a first node according to an embodiment of the present disclosure.

FIG. 2-10 is still another schematic diagram of sending data of a second FlexE client by a first node according to an embodiment of the present disclosure.

FIG. 2-11 is yet another schematic diagram of sending data of a second FlexE client by a first node according to an embodiment of the present disclosure.

FIG. 3-1 is a flowchart of another data transmission method according to an embodiment of the present disclosure.

FIG. 3-2 is a flowchart of recovering m first FlexE clients according to an embodiment of the present disclosure.

FIG. 3-3 is a schematic structural diagram of a FlexE ring network in which there is a faulty node according to an embodiment of the present disclosure.

FIG. 4-1 is a flowchart of still another data transmission method according to an embodiment of the present disclosure.

FIG. 4-2 is a flowchart of performing a forwarding operation on data of a second FlexE client according to an embodiment of the present disclosure.

FIG. 5-1 is a schematic structural diagram of a data transmission apparatus according to an embodiment of the present disclosure.

FIG. 5-2 is a schematic structural diagram of a mapping module according to an embodiment of the present disclosure.

FIG. 5-3 is a schematic structural diagram of a mapping submodule according to an embodiment of the present disclosure.

FIG. 6-1 is a schematic structural diagram of another data transmission apparatus according to an embodiment of the present disclosure.

FIG. 6-2 is a schematic structural diagram of a first processing module according to an embodiment of the present disclosure.

FIG. 6-3 is a schematic structural diagram of still another data transmission apparatus according to an embodiment of the present disclosure.

FIG. 6-4 is a schematic structural diagram of another first processing module according to an embodiment of the present disclosure.

FIG. 7 is a schematic structural diagram of yet another data transmission apparatus according to an embodiment of the present disclosure.

DESCRIPTION OF EMBODIMENTS

To make the objectives, technical solutions, and advantages of this disclosure clearer, the following further describes the implementations of this disclosure in detail with reference to the accompanying drawings.

To make readers more profoundly understand this disclosure, a FlexE technology is briefly described herein. In the FlexE technology, K (1≤K≤254) physical interfaces having 100G time domain resources on one node may be bound to obtain one FlexE group, and one node may be provided with at least one FlexE group. A time domain resource of each of the K physical interfaces is divided into 20 5G timeslots, and one FlexE group is corresponding to 20×K timeslots. The 20×K timeslots are classified into a plurality of groups, one group of timeslots is used to transmit data of one FlexE client, and one FlexE client is one data flow. For example, each group of timeslots may include one timeslot, may include two timeslots, may include five timeslots, or the like.

For example, one physical interface (that is, K is equal to 1) of a node P is bound to obtain one FlexE group, a group identifier of the FlexE group is P1, and the FlexE group is corresponding to 20 timeslots. The 20 timeslots are classified into two groups, and each group of timeslots includes 10 timeslots. A first group of timeslots is used to transmit data of a FlexE client whose flow identifier is YL1, and a second group of timeslots is used to transmit data of a FlexE client whose flow identifier is YL2. The node P stores a correspondence between a node identifier, a group identifier of a FlexE group, a timeslot identifier, and a flow identifier of a FlexE client. For the node P, a node identifier is used to uniquely identify a node, a group identifier of a FlexE group is used to uniquely identify the FlexE group, and a flow identifier of a FlexE client is used to uniquely identify the FlexE client. For example, the timeslot identifier is used to uniquely indicate one timeslot, and the timeslot identifier may be a number of the timeslot. For example, the correspondence may be shown in Table 1. Referring to Table 1, timeslots whose timeslot identifiers are 1 to 10 are used to transmit the data of the FlexE client whose flow identifier is YL1, and timeslots whose timeslot identifiers are 11 to 20 are used to transmit the data of the FlexE client whose flow identifier is YL2.

TABLE 1

| Node identifier | Group identifier of a FlexE group | Timeslot identifier | Flow identifier of a FlexE client |
| --- | --- | --- | --- |
| P | P1 | 1, 2, 3, 4, 5, 6, 7, 8, 9, and 10 | YL1 |
|   |   | 11, 12, 13, 14, 15, 16, 17, 18, 19, and 20 | YL2 |

Figure 1:
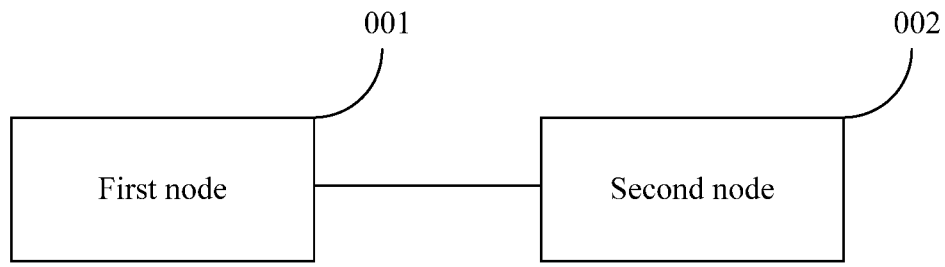
FIG. 1-1 is a schematic diagram of an implementation environment according to an embodiment of the present disclosure.

FIG. 1-1 is a schematic diagram of an implementation environment according to each embodiment of the present disclosure. As shown in FIG. 1-1, the implementation environment may include a first node 001 and a second node 002. Both the first node 001 and the second node 002 are devices that support the FlexE technology. For example, the first node and the second node may be a switch, a router, or the like. A quantity of first nodes and that of second nodes are not limited in this embodiment of the present disclosure.

Figures 1, 2:
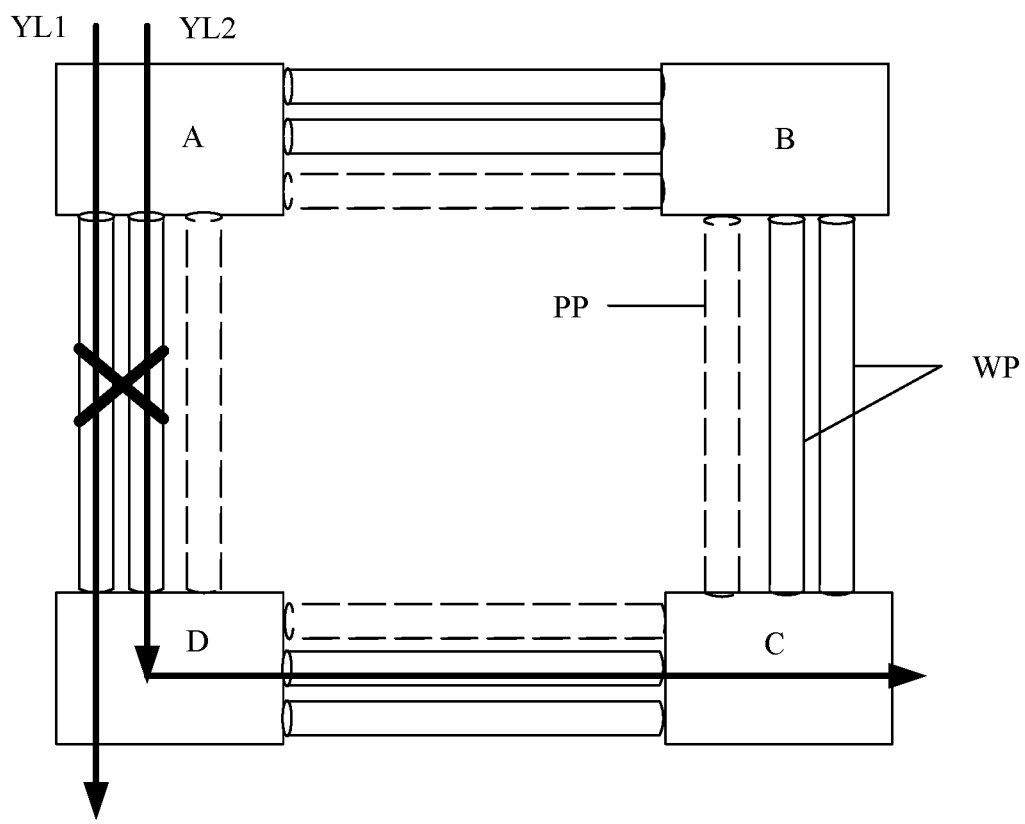

For example, the first node and the second node may be nodes in a FlexE ring network. As shown in FIG. 1-2, the FlexE ring network may include a plurality of nodes, the plurality of nodes form a working path WP and a protection path PP, and both the working path WP and the protection path PP are two-way transmission paths. The first node may be a node A, and the second node may be a node D. FIG. 1-2 illustrates two working paths WP and one protection path PP, the working path WP is represented by using a solid line, and the protection path PP is represented by using a dashed line.

For the FlexE ring network, protection switching is a very important link. The protection switching means that in a communications system, to ensure data transmission reliability, a protection path is used for data transmission when a working path used for data transmission is faulty, so as to avoid service interrupt. In a related technology, a ring network protection mode is usually used to implement protection switching, and currently, the ring network protection mode may be applicable to a network technology of a hierarchical structure, for example, Multiprotocol Label Switching traffic policing (Multiprotocol Label Switching-Transport Profile, MPLS-TP) or an optical transport network (Optical Transport Network, OTN). However, because there is no nested relationship between FlexE clients in the FlexE technology, the FlexE technology is not a network technology of a hierarchical structure but a network technology of a flat structure. Therefore, a ring network protection mode applicable to the FlexE technology is urgently required.

In this disclosure, when a node in the FlexE ring network detects that an element (the element may be a node or a link) closest to the node on a working path is faulty, the node can map a plurality of working FlexE clients that are to be sent to a next node on the working path to one protection FlexE client, and then transmit data of the protection FlexE client along a protection path. Therefore, this disclosure provides a ring network protection mode applicable to the FlexE technology.

For example, in FIG. 1-2, a link between the node A and the node D is faulty. When the node A detects that the link between the node A and the node D on the working path WP is faulty, the node A can map two working FlexE clients that are to be sent to the node D on the working path WP to one protection FlexE client, and then transmit, along the protection path PP, data of the protection FlexE client to the node D close to the faulty link.

Figures 1, 2, 3:
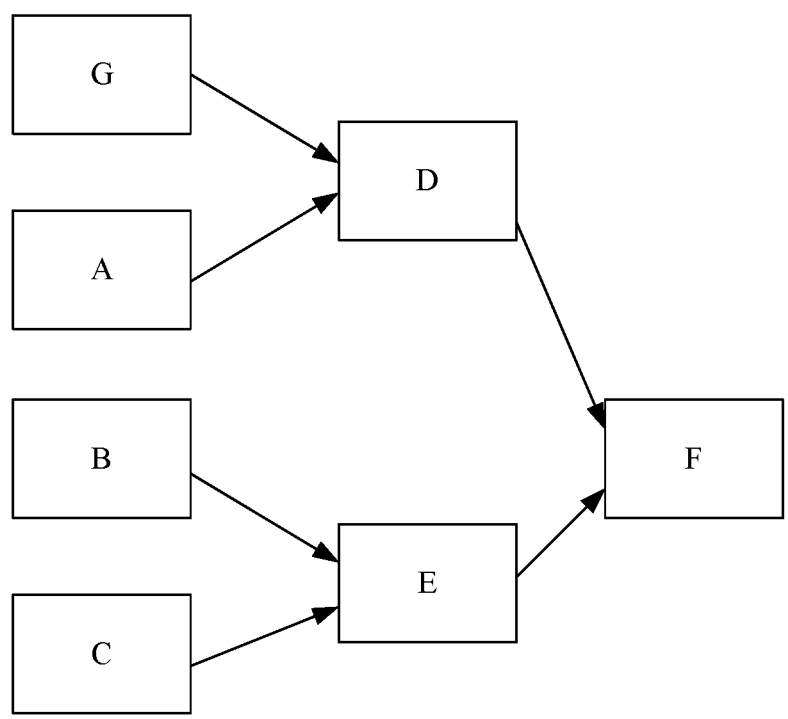

For example, the first node and the second node may alternatively be nodes in a FlexE-based hierarchical network. As shown in FIG. 1-3, the FlexE-based hierarchical network may include a plurality of nodes, and the plurality of nodes are of a hierarchical structure. For example, the first node may be a node A, a node B, and a node C at a first level, and the second node may be a node D and a node E at a second level. For example, the node B may map a plurality of first FlexE clients to one second FlexE client, and then transmit data of the second FlexE client to the node E. The node C maps a plurality of first FlexE clients to one second FlexE client, and then transmits data of the second FlexE client to the node E. Then, the node E maps the two second FlexE clients to one third FlexE client, and then transmits data of the third FlexE client to the node F. Likewise, the node F may map a plurality of third FlexE clients for transmission. In this hierarchical FlexE client mapping manner, the node does not need to process all data at a granularity of one FlexE client.

Application scenarios of the first node and the second node are not limited in this embodiment of the present disclosure.

FIG. 2-1 is a flowchart of a data transmission method according to an embodiment of the present disclosure. The method may be applied to the implementation environment shown in FIG. 1-1. As shown in FIG. 2-1, the method may include the following blocks.

Block 201: A first node obtains m first FlexE clients, where $m \geq 2$.

For example, the first node may be a device that supports a FlexE technology, for example, a switch or a router. To simultaneously transmit data of a plurality of first FlexE clients, the first node first obtains the plurality of first FlexE clients. One FlexE client is one data flow.

Block 202: The first node maps the m first FlexE clients to one second FlexE client, where data of each first FlexE client occupies a fixed timeslot of the second FlexE client.

It is assumed that there are totally x ($x \geq 2$) timeslots of the second FlexE client, and each of the x timeslots has one timeslot identifier. The data of each first FlexE client occupies the fixed timeslot of the second FlexE client, in other words, a timeslot identifier of the timeslot occupied by the data of each first FlexE client remains unchanged. It is assumed that there are totally five timeslots of the second FlexE client, and timeslot identifiers of the five timeslots are respectively ST1, ST2, ST3, ST4, and ST5. The first node obtains two first FlexE clients: a first FlexE client YL1 and a first FlexE client YL2. After the first node maps the two first FlexE clients to one second FlexE client, data of the first FlexE client YL1 occupies timeslots of the second FlexE client whose timeslot identifiers are ST1 and ST2, in other words, the data of the first FlexE client YL1 occupies the first two timeslots of the second FlexE client, and data of the first FlexE client YL2 occupies timeslots of the second FlexE client whose timeslot identifiers are ST3, ST4, and ST5, in other words, the data of the first FlexE client YL2 occupies the last three timeslots of the second FlexE client. In a subsequent transmission process, the data of the first FlexE client YL1 always occupies the timeslots whose timeslot identifiers are ST1 and ST2, the data of the first FlexE client YL2 always occupies the timeslots whose timeslot identifiers are ST3, ST4, and ST5, and the timeslots of second FlexE client that are occupied by the data of the first FlexE client YL1 and the timeslots of the second FlexE client that are occupied by the data of the first FlexE client YL2 remain unchanged, so as to facilitate data recovery.

It should be noted that in a related technology, a clock between nodes usually has a deviation, and the deviation is usually 100 parts per million (100 Parts Per Million, 100 ppm). The clock is corresponding to a data sending rate. For example, a node L1, a node L2, and a node L3 are sequentially connected, and a data sending rate of the node L2 is 10 Gbps (gigabit per second). In this case, a data sending rate of the node L1 may be (10 Gbps+100 ppm), and a data sending rate of the node L3 may be (10 Gbps-100 ppm). Therefore, when the node L1 continuously sends the data of the first FlexE client to the node L3 by using the node L2, the data sending rate of the node L1 is greater than both the data sending rate of the node L2 and the data sending rate of the node L3. Therefore, to ensure that the node L2 can send the to-be-sent data to the node L3 in time, and avoid a case in which a relatively large amount of data on the node L2 cannot be sent in a short period of time, the node L2 should perform a rate adjustment operation. For example, when performing the rate adjustment operation, the node L2 may delete some redundant idle (IDLE) code blocks from the data, to improve a data transmission rate. Likewise, when the data sending rate of the node L1 is (10 Gbps–100 ppm), and the data sending rate of the node L3 is (10 Gbps+100 ppm), to ensure normal data transmission, the node L2 also should perform a rate adjustment operation. For example, the node L2 may add some idle code blocks to the currently to-be-transmitted data of the first FlexE client, to reduce a data transmission rate. However, such the operation of adding idle code blocks or deleting idle code blocks that is performed for rate adjustment increases uncertainty of a timeslot occupied by the data of the first FlexE client in a transmission process, in other words, data code blocks in the data of the first FlexE client are in different timeslots in different time periods. Consequently, a data recovery difficulty is increased.

Figures 1, 2:
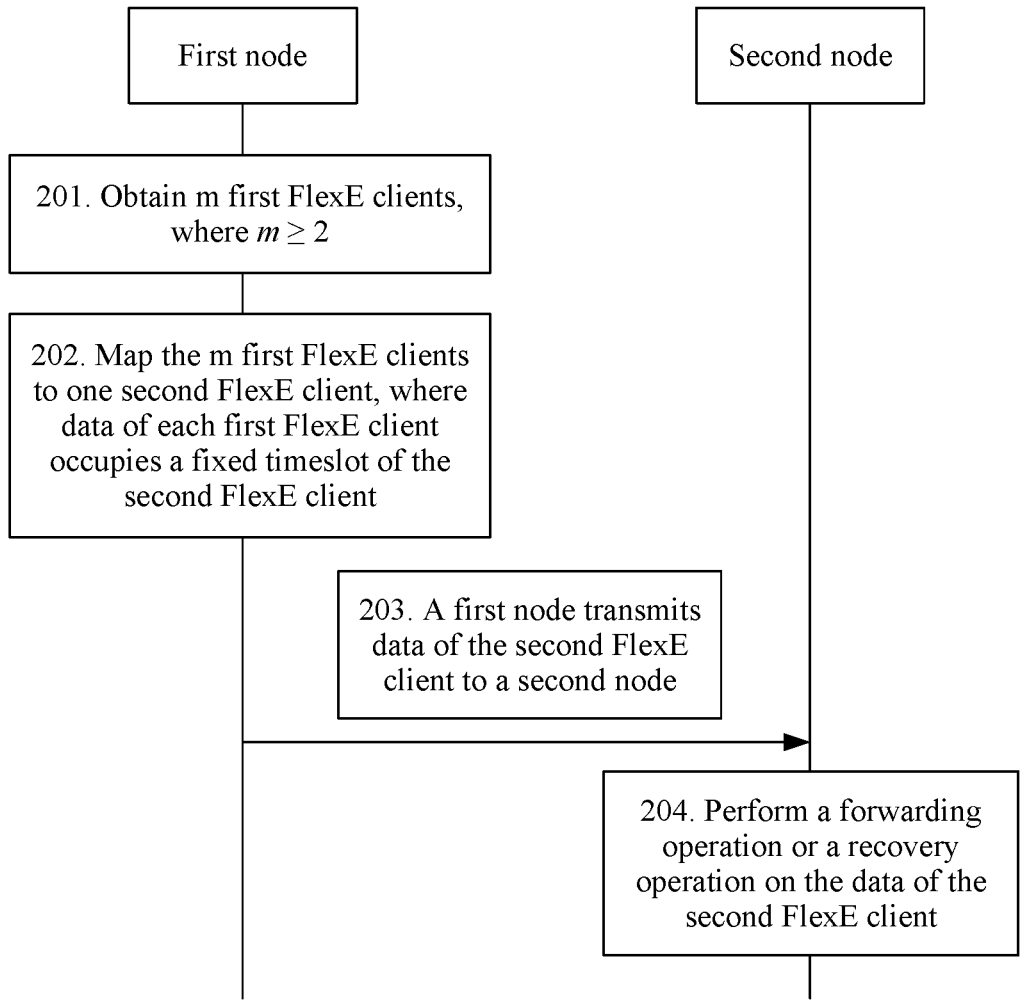
Figures 2, 2A:
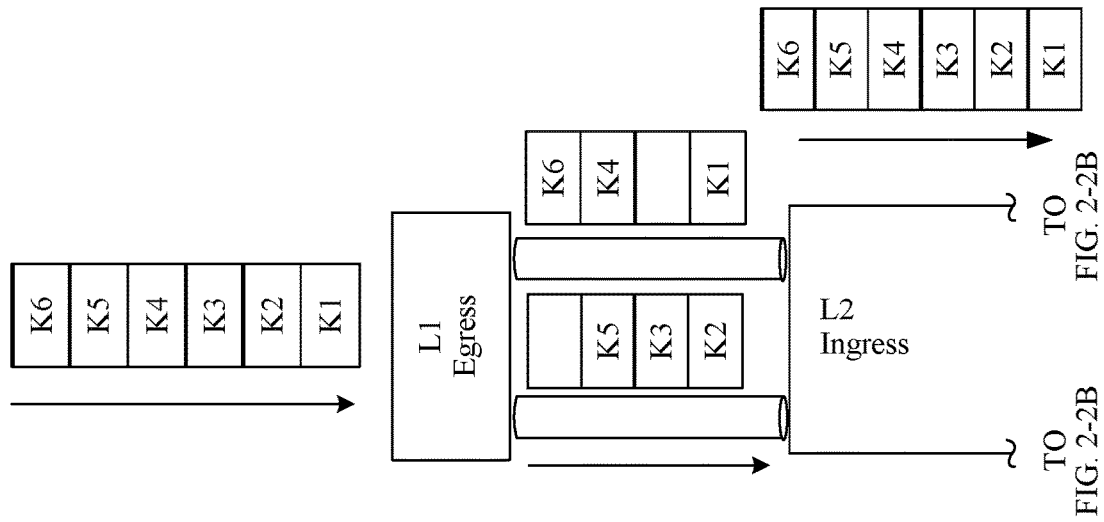
Figures 2, 2B:
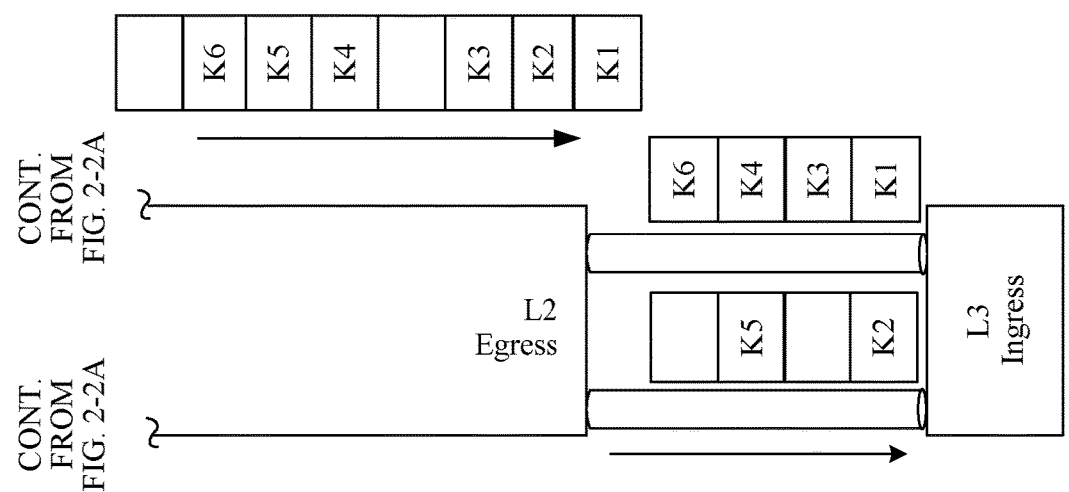
Figures 2, 3:
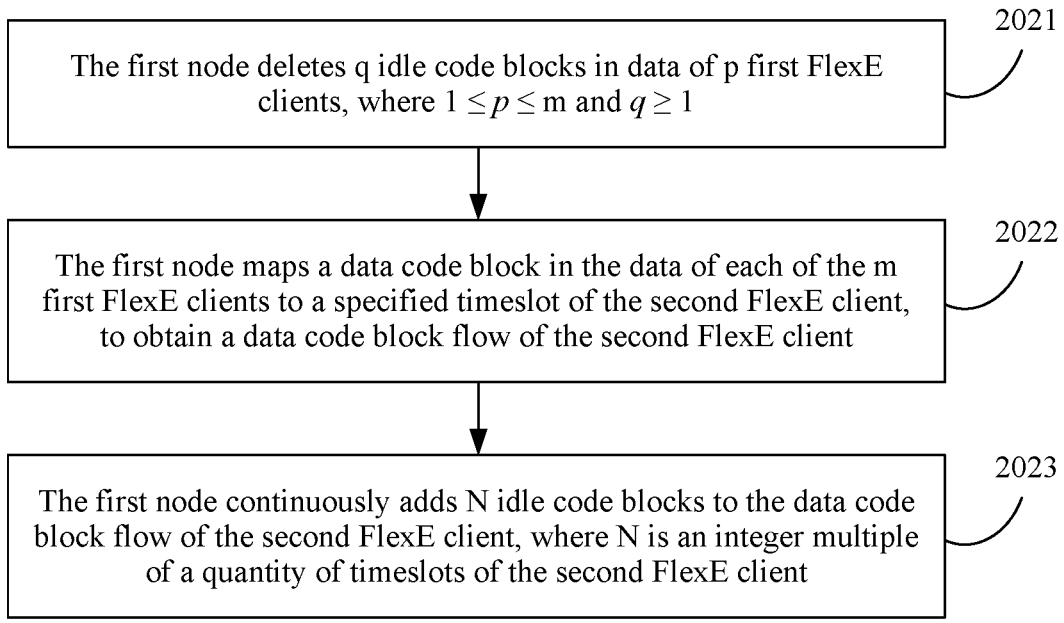

FIG. 2-2A and FIG. 2-2B illustrate a schematic diagram of transmitting the data of the first FlexE client YL1 by the node L1, the node L2, and the node L3. It is assumed that the data sending rate of the node L1 is less than the data sending rate of the node L2, the data sending rate of the node L2 is less than the data sending rate of the node L3, and the data of the first FlexE client YL1 includes six data code blocks: K1, K2, K3, K4, K5, and K6. When the node L1 sends the data of the first FlexE client YL1 to the node L2, because the data sending rate of the node L1 is less than the data sending rate of the node L2, the node L1 may add two idle code blocks to the six data code blocks. A first idle code block is between K2 and K3, and a second idle code block is after K6. Data of a processed first FlexE client YL1 on the node L1 is sent to the node L2 by using two timeslots, K1, the first idle code block, K4, and K6 occupy one timeslot, and K2, K3, K5, and the second idle code block occupy one timeslot. When receiving the data of the processed first FlexE client YL1, the node L2 first deletes two idle code blocks from the data. Then, when the node L2 sends the six data code blocks to the node L3, because the data sending rate of the node L2 is less than the data sending rate of the node L3, the node L2 may add two idle code blocks to the six data code blocks. A first idle code block is between K3 and K4, and a second idle code block is after K6. Data of a processed first FlexE client YL1 on the node L2 is transmitted by using two timeslots, K1, K3, K4, and K6 occupy one timeslot, and K2, the first idle code block, K5, and the second idle code block occupy one timeslot. In this process, both the node L1 and the node L2 perform an idle code block addition operation on the data of the first FlexE client YL1, locations of the added idle code blocks are different, and timeslots occupied by the data code blocks in the data of the first FlexE client YL1 change in the transmission process.

In this embodiment of the present disclosure, when transmitting the data of the plurality of first FlexE clients, the node maps the plurality of first FlexE clients to one second FlexE client. The data of each first FlexE client occupies the fixed timeslot of the second FlexE client, in other words, the timeslot of the second FlexE client that is occupied by the data of each first FlexE client in the transmission process remains unchanged, so as to facilitate data recovery.

Optionally, as shown in FIG. 2-3, block 202 may include the following blocks.

Block 2021: The first node deletes q idle code blocks from data of p first FlexE clients, where $1 \le p \le m$ and $q \ge 1$.

To meet a requirement for a data transmission rate between nodes, before mapping the m first FlexE clients to one second FlexE client, the first node may preprocess the data of the p ($1 \le p \le m$) first FlexE clients. For example, the first node may delete some redundant idle code blocks from the data of the p first FlexE clients, so that the first node can subsequently continuously add a plurality of idle code blocks to a data code block flow of the second FlexE client. The plurality of continuously added idle code blocks are used to ensure that the data of the first FlexE client occupies the fixed timeslot of the second FlexE client.

When deleting the idle code blocks from the data of the p first FlexE clients, the first node deletes q idle code blocks from data of each first FlexE client. Assuming that m is equal to 5, p is equal to 2, and q is equal to 1, the first node may delete idle code blocks from data of two first FlexE clients, and delete one idle code block from data of each first FlexE client.

Block 2021 is an optional block. When a quantity of original idle code blocks in the data of the m first FlexE clients is relatively small, the first node may not perform block 2021.

Block 2022: The first node maps a data code block in the data of each of the m first FlexE clients to a specified timeslot of the second FlexE client, to obtain a data code block flow of the second FlexE client.

Figures 2, 3, 4:
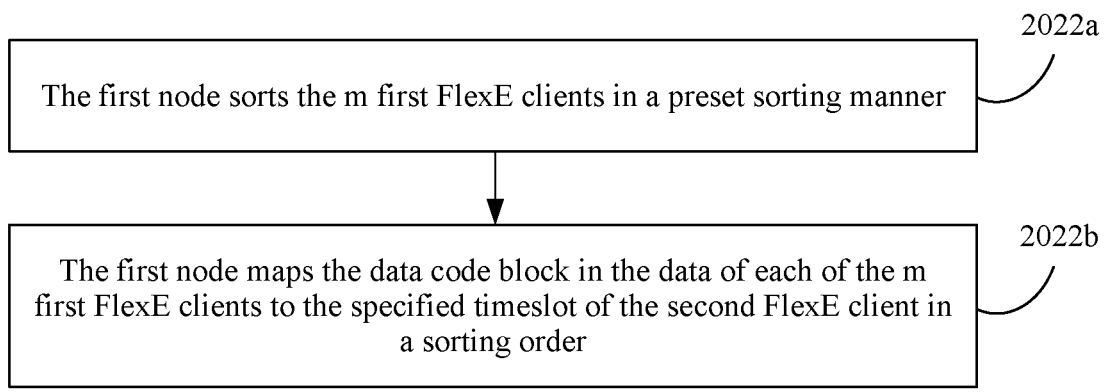

Optionally, as shown in FIG. 2-4, that the first node maps a data code block in the data of each of the m first FlexE clients to a specified timeslot of the second FlexE client in block 2022 may include the following blocks.

Block 2022a: The first node sorts the m first FlexE clients in a preset sorting manner.

When mapping the data code block in the data of each first FlexE client to the specified timeslot of the second FlexE client, the first node may sort the m first FlexE clients, and then map the data code block in the data of each first FlexE client to the specified timeslot of the second FlexE client in a sorting order.

Optionally, block 2022a may include: sorting the m first FlexE clients based on content of a flow label corresponding to each of the m first FlexE clients.

The first FlexE client may be identified by using the flow label corresponding to the first FlexE client. The first node is provided with the flow label corresponding to the first FlexE client. The flow label corresponding to the first FlexE client may be used to indicate a forwarding path of the data of the first FlexE client.

Information included in the flow label corresponding to the first FlexE client may be represented in a plurality of manners, and the following manners are used as an example for description herein.

In a first manner, the flow label of the first FlexE client with which the first node is provided may include node identifiers of all nodes configured to transmit the data of the first FlexE client, and information about a relationship between any two neighboring nodes configured to transmit the data of the first FlexE client.

To fully identify a first FlexE client between any two neighboring nodes, for a pair of two neighboring nodes, information about a relationship between the two neighboring nodes may include a group identifier of a FlexE group to which the first FlexE client belongs on a node configured to send the data of the first FlexE client, a flow identifier of the first FlexE client, and information about a timeslot occupied by the data of the first FlexE client. Different pairs of neighboring nodes are provided with different flow identifiers of the first FlexE client. For example, a flow identifier of a first FlexE client with which the first node is provided is YL111, and a flow identifier of a first FlexE client with which a third node is provided is YL222. For example, the node identifier may be a Media Access Control (Media Access Control, MAC) address or an Internet Protocol (Internet Protocol, IP) address of a node.

Optionally, a node number may be further assigned to each node, and the node identifier may be a node number of a corresponding node. The information about the timeslot may be a timeslot identifier of the timeslot occupied by the data of the first FlexE client. For example, the timeslot identifier may be a number of the timeslot, or may be information used to indicate a location of the timeslot. The location of the timeslot may be represented in a form of a bitmap (bitmap).

For example, as shown in FIG. 2-5, a first FlexE client is transmitted from a first node 001 to a second node 002 by using a third node 003, a flow identifier of the first FlexE client with which the first node 001 is provided is YL111, a flow identifier of the first FlexE client with which the third node is provided with is YL222, and a flow identifier of the first FlexE client with which the second node is provided is YL333. The first node 001 is provided with two FlexE groups, a group identifier of a FlexE group to which the first FlexE client belongs is GP1, and timeslot identifiers of timeslots occupied by the first FlexE client between the first node 001 and the third node 003 are 1, 2, and 3. The third node 003 is provided with two FlexE groups, a group identifier of a FlexE group to which the first FlexE client belongs is GP3, and timeslot identifiers of timeslots occupied by the first FlexE client between the third node 003 and the second node 002 are 7, 8, and 9. Therefore, a flow label of the first FlexE client with which the first node 001 is provided with may include a node identifier 001 of the first node 001, a node identifier 003 of the third node 003, and a node identifier 002 of the second node 002. Information about a relationship between the first node 001 and the third node 003 may include the group identifier GP1 of the FlexE group to which the first FlexE client belongs, the flow identifier YL111 of the first FlexE client, and the timeslot identifiers 1, 2, and 3 of the timeslots occupied by the data of the first FlexE client. Information about a relationship between the third node 003 and the second node 002 may include the group identifier GP3 of the FlexE group to which the first FlexE client belongs, the flow identifier YL222 of the first FlexE client, and the timeslot identifiers 7, 8, and 9 of the timeslots occupied by data of the first FlexE client.

A node between an ingress node and an egress node of the first FlexE client may be obtained based on the ingress node and the egress node of the first FlexE client, and the information about the relationship between any two neighboring nodes. Therefore, when a quantity of nodes is relatively large, to reduce storage space required by the flow label of the first FlexE client, in a second manner, the flow label of the first FlexE client with which the first node is provided may include the ingress node of the first FlexE client, the egress node of the first FlexE client, and the information about the relationship between any two neighboring nodes configured to transmit the data of the first FlexE client.

Optionally, different nodes may be provided with a same flow identifier of the first FlexE client. For example, a flow identifier of a first FlexE client with which the first node is provided is YL111, and a flow identifier of a first FlexE client with which a third node is provided is still YL111. To further simplify the information in the flow label of the first FlexE client, in a third manner, the flow label of the first FlexE client with which the first node is provided may include an ingress node of the first FlexE client, an egress node of the first FlexE client, a flow identifier of the first FlexE client, and a group identifier of a FlexE group to which the first FlexE client belongs on a node that is in any two neighboring nodes and that is configured to send the data of the first FlexE client.

Referring to Table 1, there is a correspondence between a group identifier of a FlexE group, a timeslot identifier, and a flow identifier of a FlexE client. Therefore, when the flow label of the first FlexE client includes the group identifier of the FlexE group to which the first FlexE client belongs and the flow identifier of the first FlexE client, information about the timeslot occupied by the data of the first FlexE client may be obtained based on the group identifier of the FlexE group to which the first FlexE client belongs and the flow identifier of the first FlexE client. Therefore, in a third manner, the flow label of the first FlexE client may not include the information about the timeslot occupied by the data of the first FlexE client.

The group identifier of the FlexE group to which the first FlexE client belongs has been configured when the node is initially configured. Therefore, to further simplify the information in the flow label of the first FlexE client, in a fourth manner, the flow label of the first FlexE client with which the first node is provided may include an ingress node of the first FlexE client, an egress node of the first FlexE client, and a flow identifier of the first FlexE client. Different nodes are provided with a same flow identifier of the first FlexE client.

In this embodiment of the present disclosure, the m first FlexE clients are sorted in a plurality of manners based on the content of the flow label corresponding to each of the m first FlexE clients. For example, the m first FlexE clients may be sorted based on a representation form of the content of the flow label corresponding to the first FlexE client.

For example, when the representation form of the content of the flow label corresponding to the first FlexE client is a character string, the first node may sort the m first FlexE clients based on a size of a character string included in the flow label corresponding to each of the m first FlexE clients. Sizes of character strings may be usually compared based on ASCII code values of corresponding-bit characters of the character strings. It is assumed that m is equal to 2, a flow label corresponding to the first FlexE client YL1 is bdcedfs, a flow label corresponding to the first FlexE client YL2 is abckjhnd, and each—bit characters of the two character strings are compared from left to right. Because the first bit of bdcedfs is b, the first bit of abckjhnd is a, and an ASCII code value of b is greater than an ASCII code value of a, bdcedfs is greater than abckjhnd. Therefore, a sorting result obtained after the first node sorts the first FlexE client YL1 and the first FlexE client YL2 is that the first FlexE client YL1 ranks first, and the first FlexE client YL2 ranks second.

For example, when the representation form of the content of the flow label corresponding to the first FlexE client is a binary number, the first node may sort the m first FlexE clients based on a size of a binary number included in the flow label corresponding to each of the m first FlexE clients. It is assumed that m is equal to 2, a flow label corresponding to the first FlexE client YL1 is 010111, and a flow label corresponding to the first FlexE client YL2 is 101010. Because a quantity of bits of 010111 is the same as a quantity of bits of 101010, and it is learned, based on comparison from left to right, that the first bit of 010111 is 0 and the first bit of 10101010 is 1, 0101110 is less than 101010. Therefore, a sorting result obtained after the first node sorts the first FlexE client YL1 and the first FlexE client YL2 is that the first FlexE client YL2 ranks first, and the first FlexE client YL1 ranks second.

Block 2022b: The first node maps the data code block in the data of each of the m first FlexE clients to the specified timeslot of the second FlexE client in a sorting order.

The data code block in the data of each first FlexE client is mapped to the specified timeslot of the second FlexE client in the sorting order, so as to improve data code block mapping efficiency.

It is assumed that in block 2022a, m is equal to 2, the first node sorts the two first FlexE clients (including the first FlexE client YL1 and the first FlexE client YL2) based on a size of a character string included in a flow label corresponding to each of the two first FlexE clients, a sorting result obtained after the sorting is that the first FlexE client YL1 ranks first, and the first FlexE client YL2 ranks second. It is assumed that there are totally five timeslots of the second FlexE client, and timeslot identifiers of the five timeslots are respectively ST1, ST2, ST3, ST4, and ST5. In block 2022b, the first node maps data blocks in data of the first FlexE client YL1 to timeslots of the second FlexE client whose timeslot identifiers are ST1 and ST2, and maps data blocks in data of the first FlexE client YL2 to timeslots of the second FlexE client whose timeslot identifiers are ST3, ST4, and ST5. In other words, the data of the first FlexE client YL1 occupies the first two timeslots of the second FlexE client, and the data of the first FlexE client YL2 occupies the last three timeslots of the second FlexE client.

Block 2023: The first node continuously adds N idle code blocks to the data code block flow of the second FlexE client, where N is an integer multiple of a quantity of timeslots of the second FlexE client.

When continuously adding the N idle code blocks to the data code block flow of the second FlexE client, the first node may continuously add the N idle code blocks at any location of the data code block flow of the second FlexE client. A location for adding the N idle code blocks is not limited in this embodiment of the present disclosure.

It is assumed that m is equal to 2, and there are totally five timeslots of the second FlexE client. Data code blocks in data of the first FlexE client YL1 are K1, K2, K3, and K4. The first node maps the data code blocks in the data of the first FlexE client YL1 to the first two timeslots of the second FlexE client, K1 and K3 are mapped to a first timeslot of the second FlexE client, and K2 and K4 are mapped to a second timeslot of the second FlexE client. Data code blocks in data of the first FlexE client YL2 are K5, K6, K7, K8, K9, and K10. The first node maps the data code blocks in the data of the first FlexE client YL2 to the last three timeslots of the second FlexE client, K5 and K8 are mapped to a third timeslot of the second FlexE client, K6 and K9 are mapped to a fourth timeslot of the second FlexE client, and K7 and K10 are mapped to a fifth timeslot of the second FlexE client. The obtained data code block flow of the second FlexE client is shown in FIG. 2-6. Then, the first node may continuously add the N (N is an integer multiple of 5) idle code blocks at any location in the data code block flow of the second FlexE client that is shown in FIG. 2-6. For example, the first node may continuously add 5, 10, or 15 idle code blocks between K1 and K2. This is not limited in this embodiment of the present disclosure.

Block 203: The first node transmits data of the second FlexE client to a second node.

The second node is different from the first node.

For example, the first node and the second node may be nodes in a FlexE ring network, or the first node and the second node may be nodes in a FlexE-based hierarchical network.

Optionally, as shown in FIG. 2-7, block 203 may include the following blocks.

Block 2031: The first node sends the data of the second FlexE client to a third node.

The third node is a node between the first node and the second node when the data of the second FlexE client is transmitted.

For example, in FIG. 2-6, the first node continuously adds five idle code blocks between K1 and K2, and a schematic diagram of sending the data of the second FlexE client to the third node by the first node is shown in FIG. 2-8A and FIG. 2-8B. The first node sends the data of the second FlexE client to the third node based on the timeslot to which the data code block in the data of each first FlexE client is mapped. The first node transmits K1 and K3 in the data of the first FlexE client YL1 by using the first timeslot of the second FlexE client, transmits K2 and K4 in the data of the first FlexE client YL1 by using the second timeslot of the second FlexE client, transmits K5 and K8 in the data of the first FlexE client YL2 by using the third timeslot of the second FlexE client, and the like.

For another example, in FIG. 2-6, the first node continuously adds five idle code blocks between K2 and K3, and a schematic diagram of transmitting the data of the second FlexE client is shown in FIG. 2-9. The first node transmits K1 and K3 in the data of the first FlexE client YL1 by using the first timeslot of the second FlexE client, transmits K2 and K4 in the data of the first FlexE client YL1 by using the second timeslot of the second FlexE client, transmits K5 and K8 in the data of the first FlexE client YL2 by using the third timeslot of the second FlexE client, and the like.

For another example, in FIG. 2-6, the first node continuously adds 10 idle code blocks between K5 and K6, and a schematic diagram of transmitting the data of the second FlexE client is shown in FIG. 2-10. The first node transmits K1 and K3 in the data of the first FlexE client YL1 by using the first timeslot of the second FlexE client, transmits K2 and K4 in the data of the first FlexE client YL1 by using the second timeslot of the second FlexE client, transmits K5 and K8 in the data of the first FlexE client YL2 by using the third timeslot of the second FlexE client, and the like.

For another example, in FIG. 2-6, the first node continuously adds five idle code blocks between K7 and K8, and a schematic diagram of transmitting the data of the second FlexE client is shown in FIG. 2-11. The first node transmits K1 and K3 in the data of the first FlexE client YL1 by using the first timeslot of the second FlexE client, transmits K2 and K4 in the data of the first FlexE client YL1 by using the second timeslot of the second FlexE client, transmits K5 and K8 in the data of the first FlexE client YL2 by using the third timeslot of the second FlexE client, and the like.

Referring to FIG. 2-8A and FIG. 2-8B to FIG. 2-11, regardless of a location at which the first node continuously adds the N idle code blocks in the data code block flow of the second FlexE client, the data of each first FlexE client occupies the fixed timeslot of the second FlexE client.

In this embodiment of the present disclosure, the first node continuously adds the N idle code blocks to the data code block flow of the second FlexE client, and N is the integer multiple of the quantity of timeslots of the second FlexE client. Therefore, when the first node sends the data of the second FlexE client to the third node, there are (Nil) idle code blocks in each timeslot of the second FlexE client, and 1 is the quantity of timeslots of the second FlexE client. In this way, it can be ensured that the data of each first FlexE client occupies the fixed timeslot of the second FlexE client, in other words, the timeslot of the second FlexE client that is occupied by the data of each first FlexE client in a transmission process remains unchanged, so as to facilitate data recovery. For example, in FIG. 2-8A and FIG. 2-8B, the data of the first FlexE client YL1 always occupies the first two timeslots of the second FlexE client, and the data of the first FlexE client YL2 always occupies the last three timeslots of the second FlexE client.

Block 2032: When detecting that there are N continuous idle code blocks in the data code block flow of the second FlexE client, the third node deletes the N idle code blocks.

For example, as shown in FIG. 2-8A and FIG. 2-8B, when detecting that there are five continuous idle code blocks in the data code block flow of the second FlexE client, the third node deletes the five idle code blocks, so that the third node performs a rate adjustment operation when sending the data of the second FlexE client to a next node.

Block 2033: When transmitting data of a processed second FlexE client to the second node, the third node continuously adds the N idle code blocks to a data code flow of the processed second FlexE client.

For example, as shown in FIG. 2-8A and FIG. 2-8B, the third node performs, at an egress, an idle code block addition operation on the data of the second FlexE client from which the N idle code blocks are deleted, and continuously adds the N idle code blocks to the data code flow of the processed second FlexE client, and N is the integer multiple of the quantity of timeslots of the second FlexE client. The idle code block addition operation performed by the third node is the same as the idle code block addition operation performed by the first node. For this process, refer to block 2023. Details are not described herein again. After performing the idle code block addition operation, the third node sends the data of the second FlexE client to which the idle code blocks are added to the second node.

It should be further noted that there may be a plurality of third nodes between the first node and the second node. For an operation performed by each third node, refer to block 2031 to block 2033. FIG. 2-8A and FIG. 2-8B illustrate one third node between the first node and the second node. A quantity of third nodes is not limited in this embodiment of the present disclosure.

In addition, to ensure normal data transmission and complete rate matching, the third node may also add or delete some idle code blocks based on an actual requirement.

Block 204: The second node performs a forwarding operation or a recovery operation on the data of the second FlexE client.

When the first node and the second node are the nodes in the FlexE ring network, the second node performs the recovery operation on the data of the second FlexE client. When the first node and the second node are the nodes in the FlexE-based hierarchical network, the second node performs the forwarding operation on the data of the second FlexE client.

In conclusion, according to the data transmission method provided in this embodiment of the present disclosure, the first node can map the plurality of obtained first FlexE clients to one second FlexE client, and transmit the data of the second FlexE client to the second node, the second node is different from the first node, and the data of each first FlexE client occupies the fixed timeslot of the second FlexE client, so that the node does not need to process all data at a granularity of one FlexE client, thereby reducing a quantity of fine-grained FlexE clients that should be processed by the node, and reducing a requirement for data processing performance of the node.

FIG. 3-1 is a flowchart of a data transmission method according to an embodiment of the present disclosure. The method may be applied to the implementation environment shown in FIG. 1-2, and the method may include the following blocks.

Block 301: When detecting that an element closest to a first node on a working path is faulty, the first node obtains m working FlexE clients that are sent to a next node on the working path, where m≥2.

The element is a node or a link.

Optionally, the first node may detect, based on a preconfigured fault detection protocol, whether the element closest to the first node on the working path is faulty. For example, the fault detection protocol may be a fault detection protocol used in a network technology, for example, an OTN, an Ethernet, or MPLS. Further, when detecting that the element closest to the first node on the working path is faulty, the first node may perform a protection coordination operation based on a preconfigured protection switching protocol, so that related nodes coordinate with each other, to jointly complete a protection switching process. For example, the protection switching protocol may be an automatic protection switching (Automatic Protection Switching, APS) protocol. For processes of fault detection and protection coordination, refer to a related technology.

For example, referring to FIG. 1-2, the first node is a node A, a second node is a node D, and an example in which a link between the node A and the node D is faulty is used for description herein.

Each node in FIG. 1-2 may be provided with ring network information of a FlexE ring network. The ring network information may include a quantity of nodes, a node identifier of each node, a connection relationship between nodes, a transmission direction of a working FlexE client, an ingress node and an egress node of each working FlexE client, a fault detection protocol, a protection switching protocol, and the like.

The node identifier may be a MAC address or an IP address of a node. Optionally, a node number may be further assigned to each node, and the node identifier may be a node number of the node. A form of the node identifier of the node is not limited in this embodiment of the present disclosure.

Further, when data of some of all working FlexE clients should be protected, the ring network information may further include flow identifiers of the working FlexE clients that should be protected. For example, the flow identifier of the working FlexE client may be represented by using 16-bit data. For example, the flow identifier of the working FlexE client may be 0111000011110001. For example, a most significant bit in the 16-bit data may be used to indicate whether the FlexE client is a working FlexE client. For example, when the most significant bit is 0, it indicates that the FlexE client is the working FlexE client.

For example, the working path WP in FIG. 1-2 is used to transmit data of two working FlexE clients: a working FlexE client YL1 and a working FlexE client YL2. An ingress node of the working FlexE client YL1 is the node A, and an egress node is the node D. An ingress node of the working FlexE client YL2 is the node A, and an egress node is a node C.

When the node A detects that a link between the node A and the node D is faulty, the node A sends fault information to the node B, the node C, and the node D to complete a protection coordination process, and the node A obtains the working FlexE client YL1 and the working FlexE client YL2 that are sent to the node D on the working path.

Block 302: The first node maps the m working FlexE clients to one protection FlexE client, where data of each working FlexE client occupies a fixed timeslot of the protection FlexE client.

For example, as shown in FIG. 1-2, it is assumed that there are totally five timeslots of the protection FlexE client, and timeslot identifiers of the five timeslots are respectively ST1, ST2, ST3, ST4, and ST5. The node A obtains the working FlexE client YL1 and the working FlexE client YL2. After the node A maps the two working FlexE clients to one protection FlexE client, data of the working FlexE client YL1 occupies the first two timeslots of the protection FlexE client, and data of the working FlexE client YL2 occupies the latter three timeslots of the protection FlexE client. In a subsequent transmission process, the data of the working FlexE client YL1 always occupies the timeslots whose timeslot identifiers are ST1 and ST2, the data of the working FlexE client YL2 always occupies the timeslots whose timeslot identifiers are ST3, ST4, and ST5, and the timeslots of protection FlexE client that are occupied by the data of the working FlexE client YL1 and the timeslots of the protection FlexE client that are occupied by the data of the working FlexE client YL2 remain unchanged.

In a related technology, a clock between nodes usually has a deviation. To ensure normal data transmission, the node should perform a rate adjustment operation, for example, add some idle code blocks to reduce a data transmission rate, or delete some idle code blocks to increase a data transmission rate. However, an operation of adding idle code blocks or deleting idle code blocks increases uncertainty of a timeslot occupied by the data of the working FlexE client in a transmission process, and further increases a data recovery difficulty. However, in this embodiment of the present disclosure, the data of each working FlexE client occupies the fixed timeslot of the protection FlexE client, in other words, the timeslot of the protection FlexE client that is occupied by the data of each working FlexE client in a transmission process remains unchanged, so as to facilitate data recovery.

Optionally, block 302 may include the following blocks.

(1) The first node deletes q idle code blocks from data of p working FlexE clients, where 1≤p≤m and q≤1.

For example, as shown in FIG. 1-2, to meet a requirement for a data transmission rate between nodes, before mapping the two working FlexE clients, the node A may delete some redundant idle code blocks from the data of the p (1≤p≤m) working FlexE clients, so that the node A can subsequently continuously add a plurality of idle code blocks to a data code block flow of the protection FlexE client. The plurality of continuously added idle code blocks are used to ensure that the data of the working FlexE client occupies the fixed timeslot of the protection FlexE client.

When a quantity of original idle code blocks in the data of them working FlexE clients is relatively small, the first node may not perform this block.

(2) The first node maps a data code block in the data of each of the m working FlexE clients to a specified timeslot of the protection FlexE client, to obtain a data code block flow of the protection FlexE client.

For example, as shown in FIG. 1-2, the node A may sort the working FlexE client YL1 and the working FlexE client YL2 in a preset sorting manner, for example, based on content of a flow label corresponding to each working FlexE client. The flow label corresponding to the working FlexE client is used to indicate a forwarding path of the data of the working FlexE client. The node A successively maps data code blocks in the data of the two working FlexE clients to specified timeslots of the protection FlexE client in a sorting order. It is assumed that there are totally five timeslots of the protection FlexE client, and the node A maps the working FlexE client YL1 to the first two timeslots of the protection FlexE client and maps the working FlexE client YL2 to the latter three timeslots of the protection FlexE client in the sorting order.

On the working path in the FlexE ring network, each node configured to transmit the data of the working FlexE client is provided with the flow label corresponding to the working FlexE client. For example, referring to FIG. 1-2, the node A and the node D are provided with a flow label corresponding to the working FlexE client YL1, and the node A, the node D, and the node C are provided with a flow label corresponding to the working FlexE client YL2. The flow label corresponding to the working FlexE client YL1 may include an ingress node of the working FlexE client YL1: the node A, an egress node of the working FlexE client YL1: the node D, and a flow identifier of the working FlexE client YL1: YL1. The node A and the node D are provided with a same flow identifier of the working FlexE client YL1: YL1.

The flow label corresponding to the working FlexE client YL2 may include an ingress node of the working FlexE client YL2: the node A, an egress node of the working FlexE client YL2: the node C, and a flow identifier of the working FlexE client YL2: YL2. The node A, the node D, and the node C are provided with a same flow identifier of the working FlexE client YL2: YL2.

For a process of this block, refer to block 2022.

(3) The first node continuously adds N idle code blocks to the data code block flow of the protection FlexE client, where N is an integer multiple of a quantity of timeslots of the protection FlexE client.

For example, as shown in FIG. 1-2, it is assumed that there are totally five timeslots of the protection FlexE client. The node A maps data code blocks in the data of the working FlexE client YL1 to the first two timeslots of the protection FlexE client, and the node A maps data code blocks in the data of the working FlexE client YL2 to the latter three timeslots of the second FlexE client. When continuously adding the N idle code blocks to the data code block flow of the protection FlexE client, the node A may continuously add 5, 10, or 15 idle code blocks to the data code block flow of the protection FlexE client.

For a process of this block, refer to block 2023.

Block 303: The first node transmits data of the protection FlexE client to a second node along a protection path.

The second node is a node close to the faulty element.

In this embodiment of the present disclosure, when the first node detects that the element closest to the first node on the working path in the FlexE ring network is faulty, the first node can map the m working FlexE clients that are to be sent to the next node on the working path to one protection FlexE client, and the data of each working FlexE client occupies the fixed timeslot of the protection FlexE client. Then, the first node transmits the data of the protection FlexE client to the second node along the protection path in the FlexE ring network, and the second node is the node close to the faulty element. In this process, a requirement for data processing performance of the node is reduced, and service interrupt occurring when the working path is faulty is avoided, so as to improve data transmission reliability, and provide a reliable ring network protection mode for a FlexE technology.

Block 303 may include: the first node transmits the data of the second FlexE client to a third node along the protection path. When detecting that there are N continuous idle code blocks in the data code block flow of the second FlexE client, the third node deletes the N idle code blocks. Then, when transmitting data of a processed second FlexE client to the second node, the third node continuously adds the N idle code blocks to a data code flow of the processed second FlexE client.

For example, in FIG. 1-2, when the node A detects that the link between the node A and the node D is faulty, the node A performs the protection coordination operation based on the preconfigured protection switching protocol: The node A sends the fault information to the node B, the node C, and the node D. Then, when transmitting the data of the protection FlexE client, the node A first sends the data of the protection FlexE client to the node B based on the timeslots to which the data code blocks in the data of the working FlexE client YL1 and the data of the working FlexE client YL2 are mapped. When detecting that there are N continuous idle code blocks in the data code block flow of the protection FlexE client, the node B deletes the N idle code blocks, so that the node B performs a rate adjustment operation when sending the data of the protection FlexE client to the node C. Then, the node B performs, at an egress, an idle code block addition operation on the data of the protection FlexE client from which the N idle code blocks are deleted, and continuously adds the N idle code blocks to the data code flow of the processed protection FlexE client, and N is the integer multiple of the quantity of timeslots of the protection FlexE client. An idle code block addition operation performed by the node B is the same as an idle code block addition operation performed by the node A. After performing the idle code block addition operation, the node B sends the data of the protection FlexE client to which the idle code blocks are added to the node C. Then, the node C sends the data of the protection FlexE client to which the idle code blocks are added to the node D in the processing manner of the node B.

In addition, to ensure normal data transmission and complete rate matching, the node B and the node C may add or delete some idle code blocks based on an actual requirement.

For a process of this block, refer to block 2031 to block 2033.

Block 304: The second node recovers the m working FlexE clients from the protection FlexE client.

Optionally, as shown in FIG. 3-2, block 304 may include the following blocks.

Block 3041: When detecting that there are N continuous idle code blocks in a data code block flow of the second FlexE client, the second node deletes the N idle code blocks.

For example, as shown in FIG. 2-8A and FIG. 2-8B, to perform a rate adjustment operation and complete rate matching, when detecting, at the ingress, that there are five continues idle code blocks in the data code block flow of the second FlexE client, the third node deletes the five idle code blocks, and then continuously adds the five idle code blocks to the data code flow of the processed second FlexE client. When detecting that there are five continuous idle code blocks in the data code flow of the second FlexE client, the second node deletes the five idle code blocks.

Block 3042: The second node recovers the m first FlexE clients based on a location of a data code block in the data of each first FlexE client.

For example, as shown in FIG. 2-8A and FIG. 2-8B, the second node recovers the first FlexE client YL1 and the first FlexE client YL2 based on locations of data code blocks in the data of the first FlexE client YL1 and locations of data code blocks in the data of the first FlexE client YL2. The data code blocks in the data of the first FlexE client YL1 are K1, K2, K3, and K4, and the data code blocks in the data of the first FlexE client YL2 are K5, K6, K7, K8, K9, and K10.

For example, in FIG. 1-2, when detecting that there are N continuous idle code blocks in the data code block flow, of the protection FlexE client, that is sent by the node C, the node D deletes the N idle code blocks. Then, the node D recovers the two working FlexE clients based on locations of data code blocks in the data of the working FlexE client YL1 and the working FlexE client YL2.

Block 305: The second node performs a target operation on the data of each of the m working FlexE clients.

The target operation is a forwarding operation or a discarding operation.

Optionally, block 305 may include:

for each of the working FlexE clients:

when it is detected, based on a flow label corresponding to the working FlexE client, that the data of the working FlexE client does not pass through the second node, performing the discarding operation on the data of the working FlexE client; or when it is detected, based on a flow label corresponding to the working FlexE client, that the data of the working FlexE client passes through the second node, performing the forwarding operation on the data of the working FlexE client, where the flow label corresponding to the working FlexE client is used to indicate a forwarding path of the data of the working FlexE client.

For example, as shown in FIG. 1-2, for the working FlexE client YL1: if the node D detects that the node D is provided with a flow label corresponding to the working FlexE client YL1, the node D may determine, based on the flow label corresponding to the working FlexE client YL1, that the data of the working FlexE client YL1 passes through the node D. Therefore, the node D performs a forwarding operation on the data of the working FlexE client YL1.

For the working FlexE client YL2: if the node D detects that the node D is provided with a flow label corresponding to the working FlexE client YL2, the node D may determine, based on the flow label corresponding to the working FlexE client YL2, that the data of the working FlexE client YL2 passes through the node D, and a next node of the node D on the working path is the node C. Therefore, the node D performs a forwarding operation on the data of the working FlexE client YL2.

In addition, when a node in the FlexE ring network is faulty, as shown in FIG. 3-3, it is assumed that the node D is faulty, and the working path WP is used to transmit data of three working FlexE clients: the working FlexE client YL1, the working FlexE client YL2, and a working FlexE client YL3 before the node D is faulty. The ingress node of the working FlexE client YL1 is the node A, and the egress node is the node D. The ingress node of the working FlexE client YL2 is the node A, and the egress node is the node C. An ingress node of the working FlexE client YL3 is the node D, and an egress node is the node C. The node A and the node D are provided with the flow label corresponding to the working FlexE client YL1, the node A, the node D, and the node C are provided with the flow label corresponding to the working FlexE client YL2, and the node D and the node C are provided with a flow label corresponding to the working FlexE client YL3.

For example, the flow label corresponding to the working FlexE client YL1 may include the ingress node of the working FlexE client YL1: the node A, the egress node of the working FlexE client YL1: the node D, and the flow identifier of the working FlexE client YL1: that is, YL1. The node A and the node D are provided with a same flow identifier of the working FlexE client YL1: YL1.

The flow label corresponding to the working FlexE client YL2 may include the ingress node of the working FlexE client YL2: the node A, the egress node of the working FlexE client YL2: the node C, and the flow identifier of the working FlexE client YL2: that is, YL2. The node A, the node D, and the node C are provided with a same flow identifier of the working FlexE client YL2: YL2.

The flow label corresponding to the working FlexE client YL3 may include the ingress node of the working FlexE client YL3: the node D, the egress node of the working FlexE client YL3: the node C, and the flow identifier of the working FlexE client YL3: that is, YL3. The node D and the node C are provided with a same flow identifier of the working FlexE client YL3: YL3.

When the node A detects that the node D is faulty, the node A sends the fault information to the node B and the node C to complete a protection coordination process. In addition, because the ingress node of the working FlexE client YL3 is the node D, the node A obtains the working FlexE client YL1 and the working FlexE client YL2 that are to be sent to the node D on the working path. The node A maps the working FlexE client YL1 and the working FlexE client YL2 to one protection FlexE client, and the data of the working FlexE client YL1 and the data of the working FlexE client YL2 occupy fixed timeslots of the protection FlexE client. Then, the node A transmits the data of the protection FlexE client to the node C along the protection path PP. Next, the node C recovers two working FlexE clients: the working FlexE client YL1 and the working FlexE client YL2 from the protection FlexE client.

For the working FlexE client YL1: if the node C detects that the node C is not provided with the flow label corresponding to the working FlexE client YL1, the node C may determine that the data of the working FlexE client YL1 does not pass through the node C. Therefore, the node C performs a discarding operation on the data of the working FlexE client YL1.

For the working FlexE client YL2: if the node C detects that the node C is provided with the flow label corresponding to the working FlexE client YL2, the node C may determine, based on the flow label corresponding to the working FlexE client YL2, that the data of the working FlexE client YL2 passes through the node C. Therefore, the node C performs a forwarding operation on the data of the working FlexE client YL2.

For the working FlexE client YL3: because the faulty node D is the ingress node of the working FlexE client YL3, the node D may directly send the data that includes an error code block or an idle code block.

In conclusion, according to the data transmission method provided in this embodiment of the present disclosure, when detecting that the element closest to the first node on the working path in the FlexE ring network is faulty, the first node can map the m (m≥2) working FlexE clients that are to be sent to the next node on the working path to one protection FlexE client, and the data of each working FlexE client occupies the fixed timeslot of the protection FlexE client. Then, the first node transmits the data of the protection FlexE client to the second node along the protection path in the FlexE ring network, and the second node is the node close to the faulty element. In the method, a plurality of first FlexE clients are mapped to one second FlexE client, so that the node does not need to process all data at a granularity of one FlexE client, the FlexE client, thereby reducing a requirement for data processing performance of the node, avoiding service interrupt occurring when the working path is faulty, improving data transmission reliability, and providing a reliable ring network protection mode for a FlexE technology.

FIG. 4-1 is a flowchart of a data transmission method according to an embodiment of the present disclosure. The method may be applied to the implementation environment shown in FIG. 1-3, and the method may include the following blocks.

Block 401: A first node obtains m first FlexE clients, where m≥2.

For example, as shown in FIG. 1-3, the first node may be a node B at a first level in a FlexE-based hierarchical network, and a second node is a node E at a second level.

Block 402: The first node maps the m first FlexE clients to one second FlexE client, where data of each first FlexE client occupies a fixed timeslot of the second FlexE client.

Optionally, the first node may sort the m first FlexE clients based on content of a flow label corresponding to each of the m first FlexE clients, and then map a data code block in the data of each of the m first FlexE clients to a specified timeslot of the second FlexE client in a sorting order.

It should be noted that in the implementation environment shown in FIG. 1-3, there is no need to consider that a node or a link is faulty, in other words, each node may perform a recovery operation on data. In this implementation environment, a node that performs a mapping operation and a node that performs a recovery operation are known. When the node that performs the mapping operation and the node that performs the recovery operation are provided with the flow label corresponding to the first FlexE client, a data transmission process may be completed. Therefore, information included in the flow label corresponding to the first FlexE client may be represented in a simpler manner. For example, the flow label corresponding to the first FlexE client may include a flow identifier of the first FlexE client and a size of the data of the first FlexE client. Different nodes are provided with a same flow identifier of the first FlexE client.

For example, as shown in FIG. 1-3, it is assumed that the node B obtains three first FlexE clients, and the node B maps the three first FlexE clients to one second FlexE client ZL1.

For a process of block 402, refer to block 202.

Optionally, when m≥3, the first node may perform a plurality of mapping operations, to be specific, block 402 may include: the first node performs a plurality of mapping operations on the m first FlexE clients, to map the m first FlexE clients to one second FlexE client. For example, the first node may perform the plurality of mapping operations on the m first FlexE clients in a grouping-first mapping-second manner. This process is described herein by using an example in which the first node performs two mapping operations. First, the first node classifies the m first FlexE clients into an L (L≥2) groups, and at least one of the L groups includes at least two first FlexE clients. Then, the first node maps first FlexE clients included in each of the L groups to one target FlexE client (data of the first FlexE clients in each group occupies a fixed timeslot of a corresponding target FlexE client), to obtain L target FlexE clients. In this case, a first mapping operation is completed. Next, the first node maps the L target FlexE clients to one second FlexE client (data of each target FlexE client occupies a fixed timeslot of the second FlexE client). In this case, a second mapping operation is completed. The data of the first FlexE clients in each of the L groups occupies the fixed timeslot of the corresponding target FlexE client, and the data of each target FlexE client occupies the fixed timeslot of the second FlexE client. Therefore, the data of each first FlexE client occupies the fixed timeslot of the second FlexE client.

Block 403: The first node transmits data of the second FlexE client to a second node.

The second node is different from the first node.

For example, as shown in FIG. 1-3, the node B maps the three first FlexE clients to one second FlexE client ZL1, and then the node B transmits data of the second FlexE client ZL1 to the node E.

For a process of block 403, refer to block 203.

Block 404: The second node performs a forwarding operation on the data of the second FlexE client.

Optionally, as shown in FIG. 4-2, block 404 may include the following blocks.

Block 4041: The second node maps, to a third FlexE client, the second FlexE client and another received second FlexE client transmitted by another node.

The another second FlexE client is obtained after the another node maps the m obtained first FlexE clients, and the data of the second FlexE client and data of the another second FlexE client each occupy a fixed timeslot of the third FlexE client, so as to facilitate data recovery.

For example, as shown in FIG. 1-3, the node B transmits the data of the second FlexE client ZL1 to the node E, and the node E maps, to the third FlexE client, the second FlexE client ZL1 and a received second FlexE client ZL2 transmitted by a node C. The second FlexE client ZL2 is obtained after the node C maps two obtained first FlexE clients. The data of the second FlexE client ZL1 and data of the second FlexE client ZL2 each occupy a fixed timeslot of the third FlexE client.

For a process of block 4041, refer to block 202.

Block 4042: The second node transmits data of the third FlexE client to a next node.

For example, as shown in FIG. 1-3, the node E transmits the data of the third FlexE client that is obtained in block 4041 to a node F. Then, the node F may map a plurality of third FlexE clients in a same mapping manner for transmission.

Further, after the next node receives the data of the third FlexE client that is transmitted by the second node, when the next node should recover a plurality of second FlexE clients from the third FlexE client, the next node may recover the plurality of second FlexE clients based on a size of data of the second FlexE clients and a sequence in which the second FlexE clients are mapped to the third FlexE client. The next node may obtain the size of the data of the second FlexE clients based on the flow label that is corresponding to the first FlexE client and with which the next node is provided. For example, the flow label corresponding to the first FlexE client includes a flow identifier of the first FlexE client and a size of the data of the first FlexE client.

For example, referring to FIG. 1-3, the node B transmits the data of the second FlexE client ZL1 to the node E, the node E maps, to the third FlexE client, the second FlexE client ZL1 and the received second FlexE client ZL2 transmitted by the node C, and transmits the data of the third FlexE client to the node F. The node F may recover the second FlexE client ZL1 and the second FlexE client ZL2 based on a size of the data of the second FlexE client ZL1, a sequence in which the second FlexE client ZL1 is mapped to the third FlexE client, a size of the data of the second FlexE client ZL2, and a sequence in which the second FlexE client ZL2 is mapped to the third FlexE client. The node F may obtain the size of the data of the second FlexE client ZL1 based on flow labels that are corresponding to three first FlexE clients (the three first FlexE clients mapped by the node B to the second FlexE client ZL1) and with which the node F is provided, and may obtain the size of the data of the second FlexE client ZL2 based on flow labels that are corresponding to two first FlexE clients (the two first FlexE clients mapped by the node C to the second FlexE client ZL2) and with which the node F is provided.

According to the data transmission method, the multi-level FlexE client mapping manner enables a plurality of fine-grained FlexE clients to be mapped to one FlexE client with a larger granularity, so that the node does not need to process all data at a granularity of one FlexE client, and nodes at different levels can process data of FlexE clients with different granularities. FlexE client nesting reduces a quantity of fine-grained FlexE clients that should be processed by the node, reduces a requirement for data processing performance of the node, and constructs a hierarchical large-scale network.

In conclusion, according to the data transmission method provided in this embodiment of the present disclosure, the first node can map the plurality of obtained first FlexE clients to one second FlexE client, and transmit the data of the second FlexE client to the second node, and the data of each first FlexE client occupies the fixed timeslot of the second FlexE client, so that the second node can map the plurality of second FlexE clients. Such the multi-level FlexE client mapping manner enables a plurality of fine-grained FlexE clients to be mapped to one FlexE client with a larger granularity, so that the node does not need to process all data at a granularity of one FlexE client, and nodes at different levels can process data of FlexE clients with different granularities. FlexE client nesting reduces a quantity of fine-grained FlexE clients that should be processed by the node, reduces a requirement for data processing performance of the node, and constructs a hierarchical large-scale network.

It should be noted that a sequence of the blocks of the data transmission method provided in this embodiment of the present disclosure may be properly adjusted, and a block may be added or removed based on situations. Any variation readily figured out by a person skilled in the art within the technical scope disclosed in this disclosure shall fall within the protection scope of this disclosure. Details are not described herein.

Figures 2, 3, 4, 5, 6:
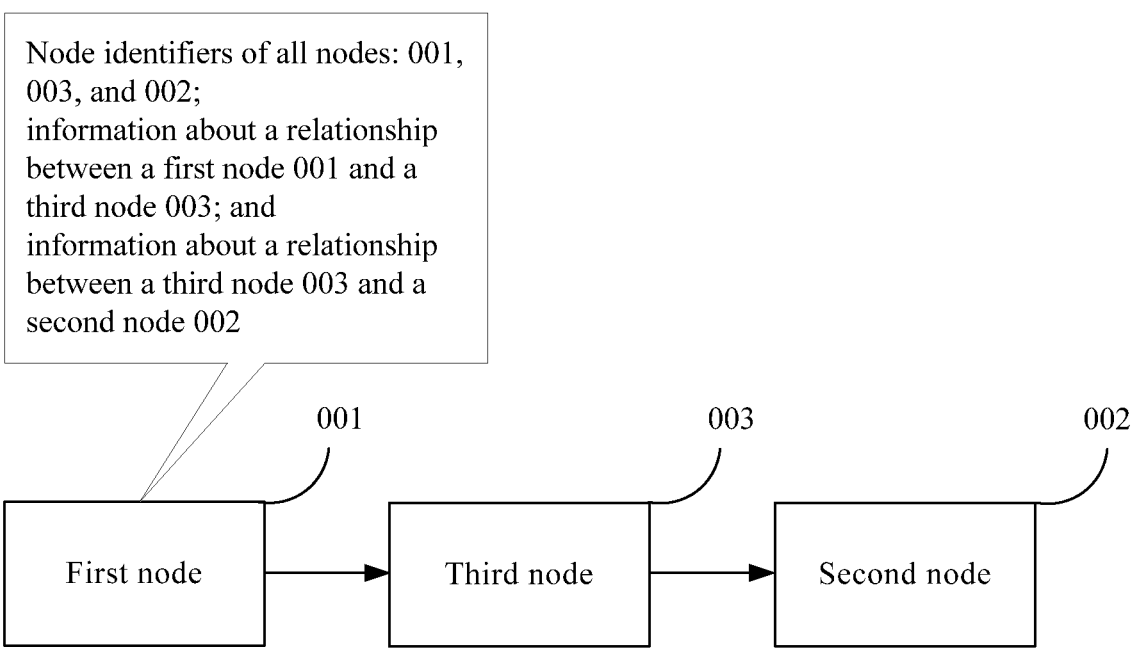

FIG. 5-1 is a schematic structural diagram of a data transmission apparatus 500 according to an embodiment of the present disclosure. The data transmission apparatus may be applied to the first node in the implementation environment shown in FIG. 1-1, and as shown in FIG. 5-1, the data transmission apparatus 500 includes:

an obtaining module 510, configured to perform block 201, block 301, or block 401 in the foregoing embodiments;

a mapping module 520, configured to perform block 202, block 302, or block 402 in the foregoing embodiments; and a transmission module 530, configured to perform block 203, block 303, or block 403 in the foregoing embodiments.

Optionally, as shown in FIG. 5-2, the mapping module 520 may include:

a mapping submodule 521, configured to perform block 2022 in the foregoing embodiment; and an addition submodule 522, configured to perform block 2023 in the foregoing embodiment.

Optionally, as shown in FIG. 5-3, the mapping submodule 521 may include:

a sorting unit 5211, configured to perform block 2022a in the foregoing embodiment; and a mapping unit 5212, configured to perform block 2022b in the foregoing embodiment.

Optionally, the sorting unit 5211 is configured to:

sort the m first FlexE clients based on content of a flow label corresponding to each of the m first FlexE clients.

Optionally, the flow label corresponding to each first FlexE client may include an ingress node of the first FlexE client, an egress node of the first FlexE client, and a flow identifier of the first FlexE client. Different nodes are provided with a same flow identifier of the first FlexE client.

Further, as shown in FIG. 5-2, the mapping module 520 further includes:

a deletion submodule 523, configured to perform block 2021 in the foregoing embodiment.

Optionally, the first node and the second node are nodes in a FlexE ring network, the FlexE ring network includes a plurality of nodes, the plurality of nodes form a working path and a protection path, both the working path and the protection path are two-way transmission paths, the first FlexE client is a working FlexE client, and the second FlexE client is a protection FlexE client. Correspondingly, the obtaining module 510 may be configured to perform block 301 in the foregoing embodiment.

Further, the transmission module 530 may be configured to perform block 303 in the foregoing embodiment.

Optionally, the first node and the second node may alternatively be nodes in a FlexE-based hierarchical network.

In conclusion, according to the data transmission apparatus provided in this embodiment of the present disclosure, the mapping module can map the plurality of first FlexE clients obtained by the obtaining module to one second FlexE client, the transmission module transmits the data of the second FlexE client to the second node. The second node is different from the first node, and the data of each first FlexE client occupies the fixed timeslot of the second FlexE client. The plurality of first FlexE clients are mapped to one second FlexE client, so that the node does not need to process all data at a granularity of one FlexE client, thereby reducing a requirement for data processing performance of the node, avoiding service interrupt occurring when the working path is faulty, improving data transmission reliability, and providing a reliable ring network protection mode for a FlexE technology.

FIG. 6-1 is a schematic structural diagram of a data transmission apparatus 600 according to an embodiment of the present disclosure. The data transmission apparatus may be applied to the second node in the implementation environment shown in FIG. 1-1, and as shown in FIG. 6-1, the data transmission apparatus 600 includes:

a receiving module 610, configured to receive data of a second FlexE client that is transmitted by a first node, where the second FlexE client is obtained after the first node maps m obtained first FlexE clients, data of each first FlexE client occupies a fixed timeslot of the second FlexE client, the first node is different from the second node, and $m \geq 2$; and a first processing module 620, configured to perform block 204 in the foregoing embodiment.

Optionally, the first node and the second node are nodes in a FlexE ring network, the FlexE ring network includes a plurality of nodes, the plurality of nodes form a working path and a protection path, both the working path and the protection path are two-way transmission paths, the first FlexE client is a working FlexE client, and the second FlexE client is a protection FlexE client. Correspondingly, the receiving module 610 may be configured to:

receive the data of the protection FlexE client that is transmitted by the first node along the protection path, where the protection FlexE client is obtained after the first node maps the m working FlexE clients that are to be sent to a next node on the working path when detecting that an element closest to the first node on the working path is faulty, and the element is a node or a link.

As shown in FIG. 6-2, the first processing module 620 may include:

a first processing submodule 621, configured to perform block 304 in the foregoing embodiment.

Further, as shown in FIG. 6-3, the data transmission apparatus 600 may further include:

a second processing module 630, configured to perform block 305 in the foregoing embodiment.

Optionally, the first processing submodule 621 is configured to perform block 3041 and block 3042 in the foregoing embodiment.

The second processing module 630 is configured to:

for each of the working FlexE clients:

when it is detected, based on a flow label corresponding to the working FlexE client, that the data of the working FlexE client does not pass through the second node, perform the discarding operation on the data of the working FlexE client; or when it is detected, based on a flow label corresponding to the working FlexE client, that the data of the working FlexE client passes through the second node, perform the forwarding operation on the data of the working FlexE client, where the flow label corresponding to the working FlexE client is used to indicate a forwarding path of the data of the working FlexE client on the working path.

Optionally, the flow label corresponding to the working FlexE client may include an ingress node of the working FlexE client, an egress node of the working FlexE client, and a flow identifier of the working FlexE client; and different nodes are provided with a same flow identifier of the working FlexE client.

Optionally, the first node and the second node are nodes in a FlexE-based hierarchical network. As shown in FIG. 6-4, the first processing module 620 may include:

a second processing submodule 622, configured to perform the forwarding operation on the data of the second FlexE client.

The second processing submodule 622 is configured to perform block 4041 and block 4042 in the foregoing embodiment.

In conclusion, according to the data transmission apparatus provided in this embodiment of the present disclosure, because the receiving module can receive the data of the second FlexE client that is transmitted by the first node, the first processing module can perform the forwarding operation or the recovery operation on the data of the second FlexE client. The second FlexE client is obtained after the first node maps the plurality of obtained first FlexE clients, the data of each first FlexE client occupies the fixed timeslot of the second FlexE client, and the first node is different from the second node. The plurality of first FlexE clients are mapped to one second FlexE client, so that the node does not need to process all data at a granularity of one FlexE client, thereby reducing a requirement for data processing performance of the node, avoiding service interrupt occurring when the working path is faulty, improving data transmission reliability, and providing a reliable ring network protection mode for a FlexE technology.

Figures 2, 3, 4, 5, 6, 7:
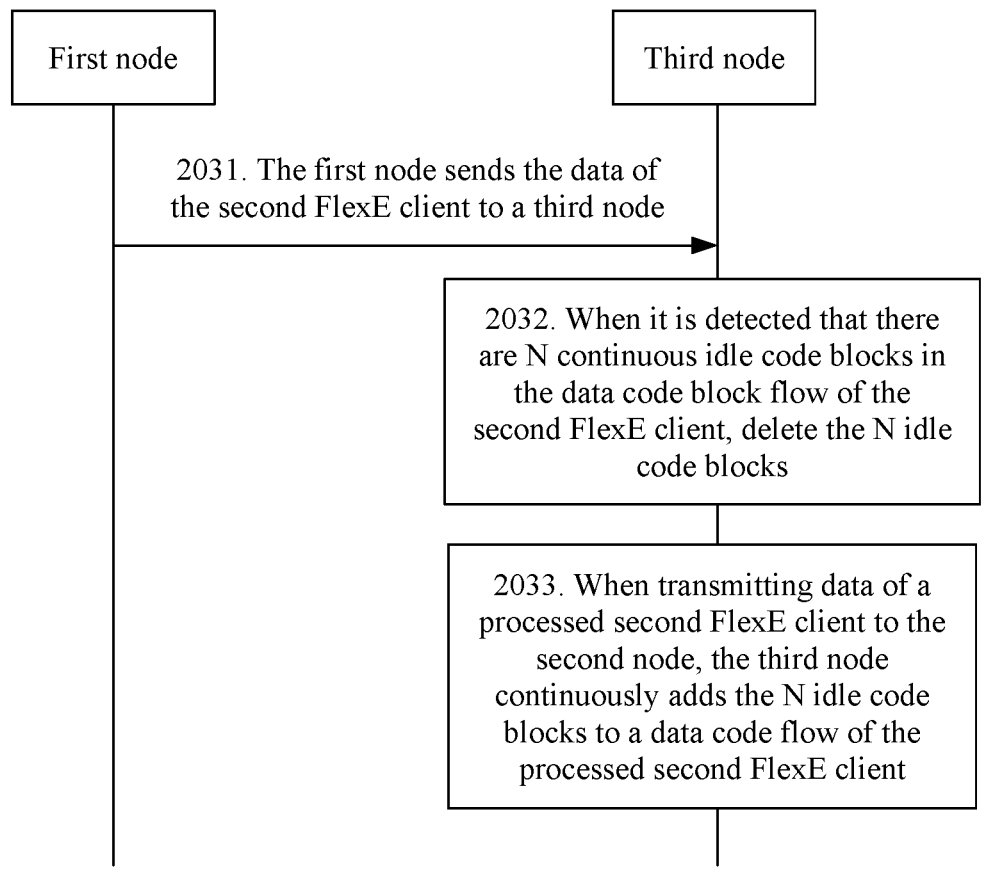
Figures 2, 3, 4, 5, 6, 7, 8, 8A:
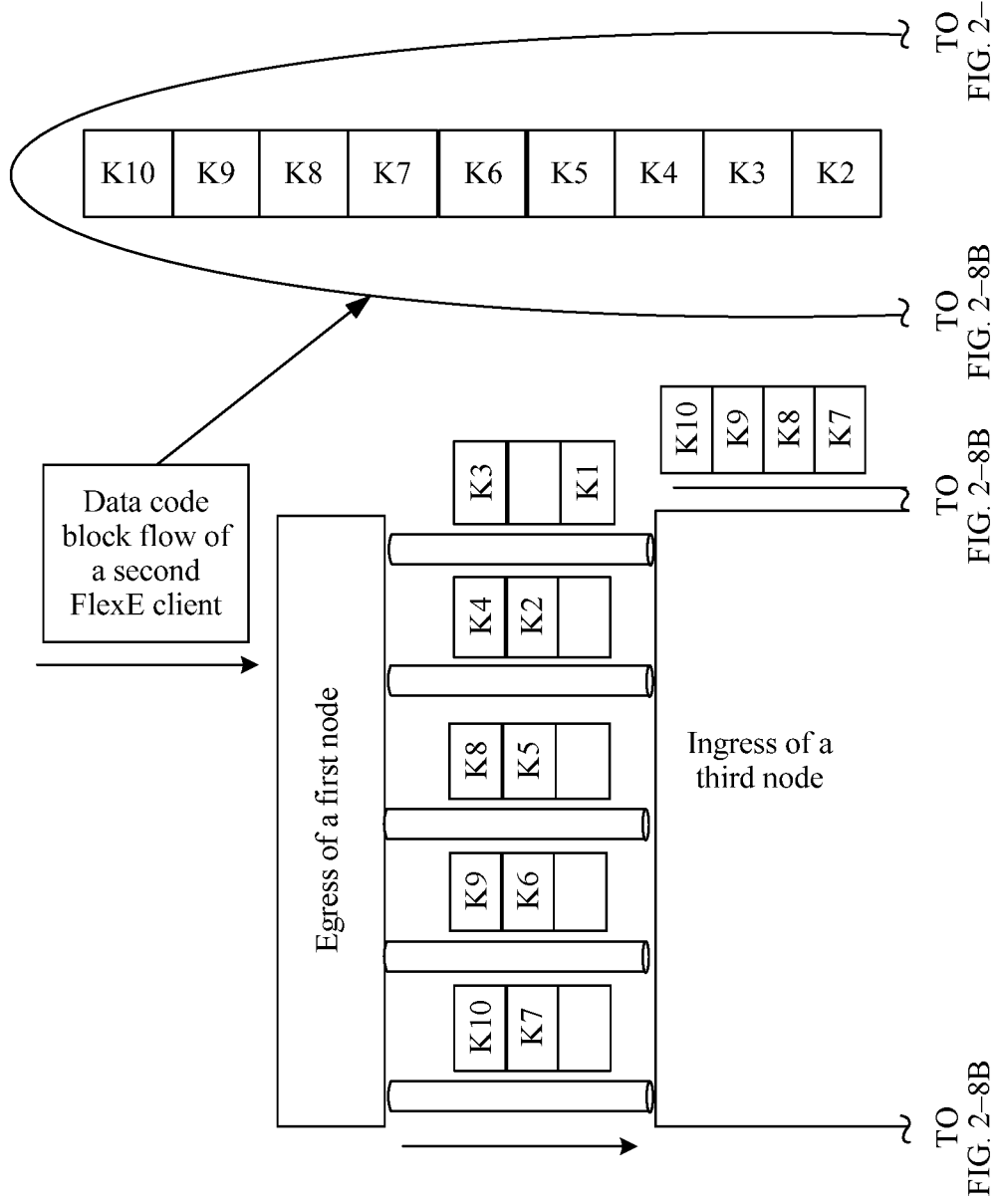
Figures 2, 3, 4, 5, 6, 7, 8, 8B:
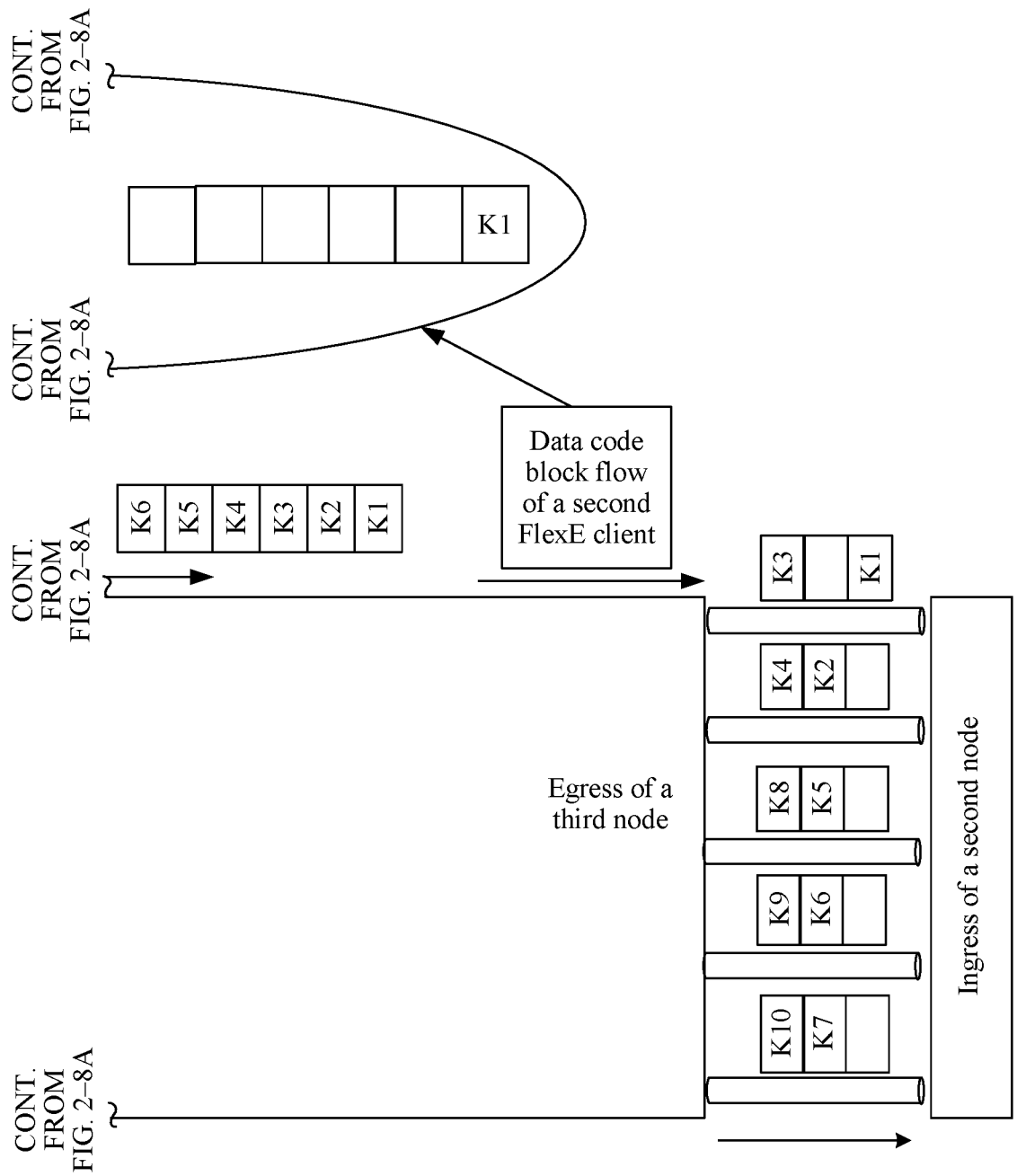
Figures 2, 3, 4, 5, 6, 7, 8, 9:
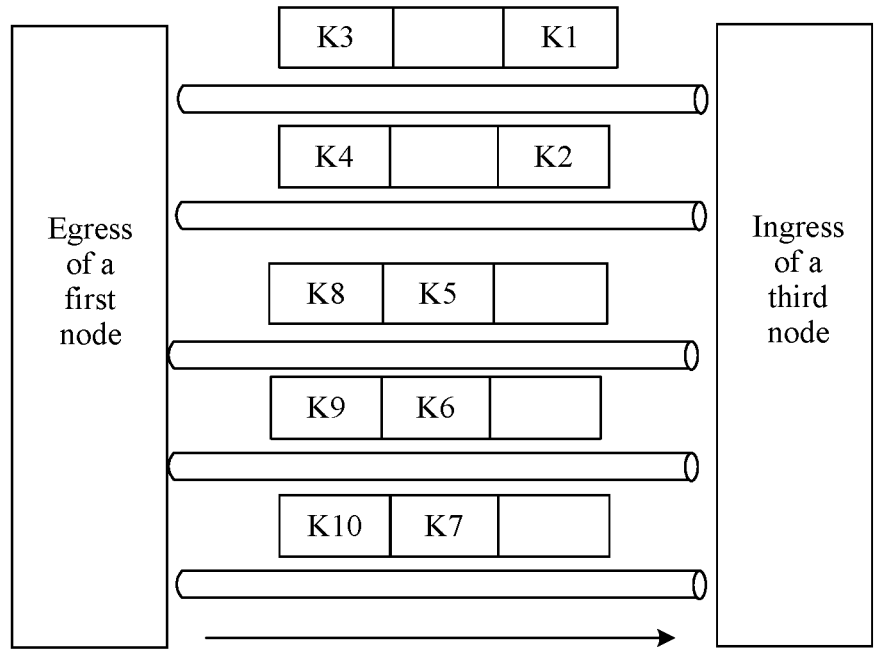
Figures 2, 3, 4, 5, 6, 7, 8, 9, 10:
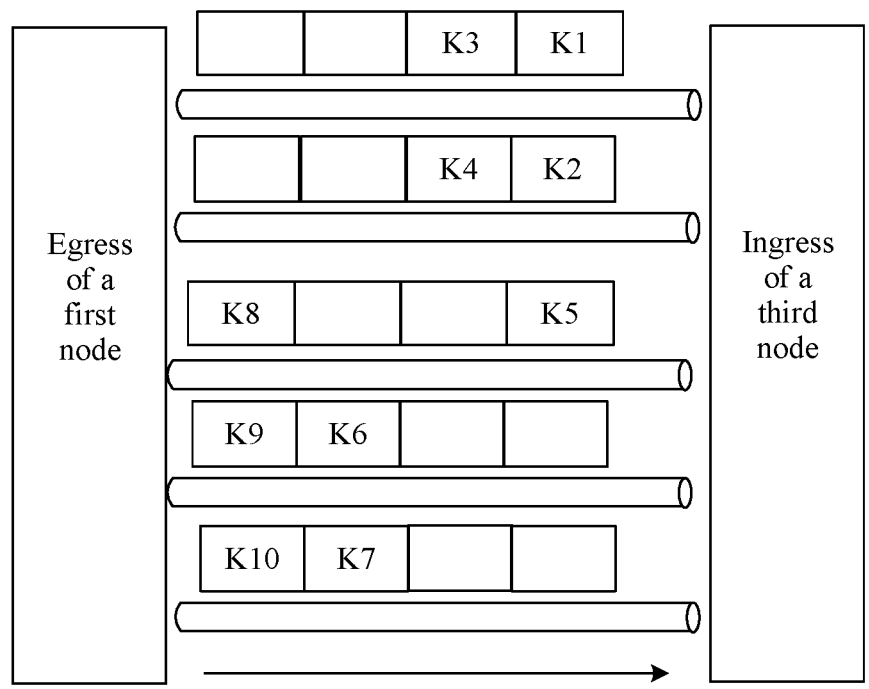
Figures 2, 3, 4, 5, 6, 7, 8, 9, 10, 11:
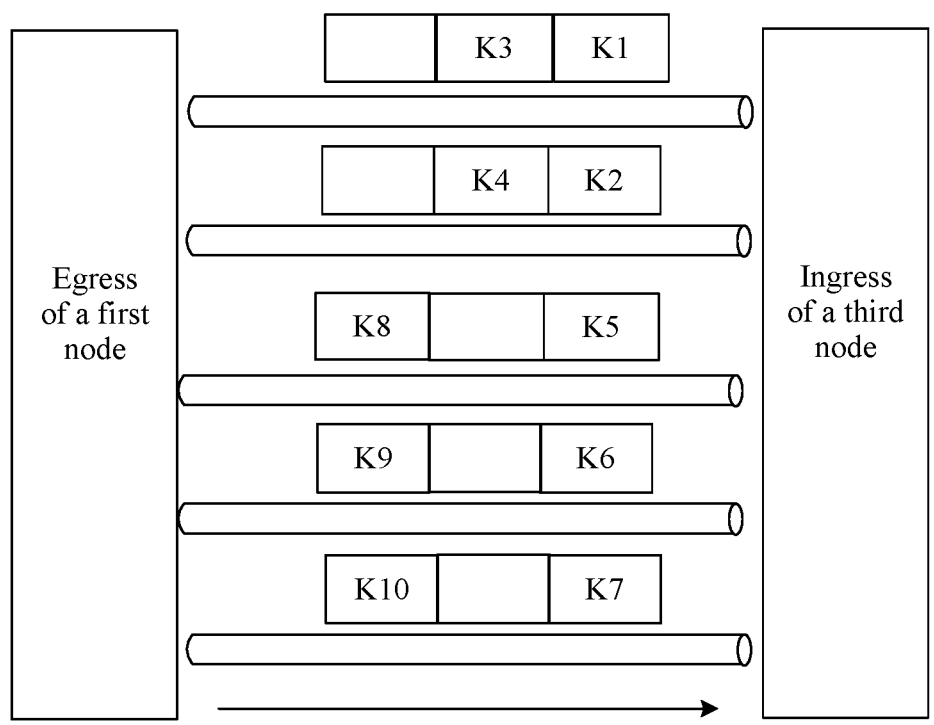
Figures 1, 3:
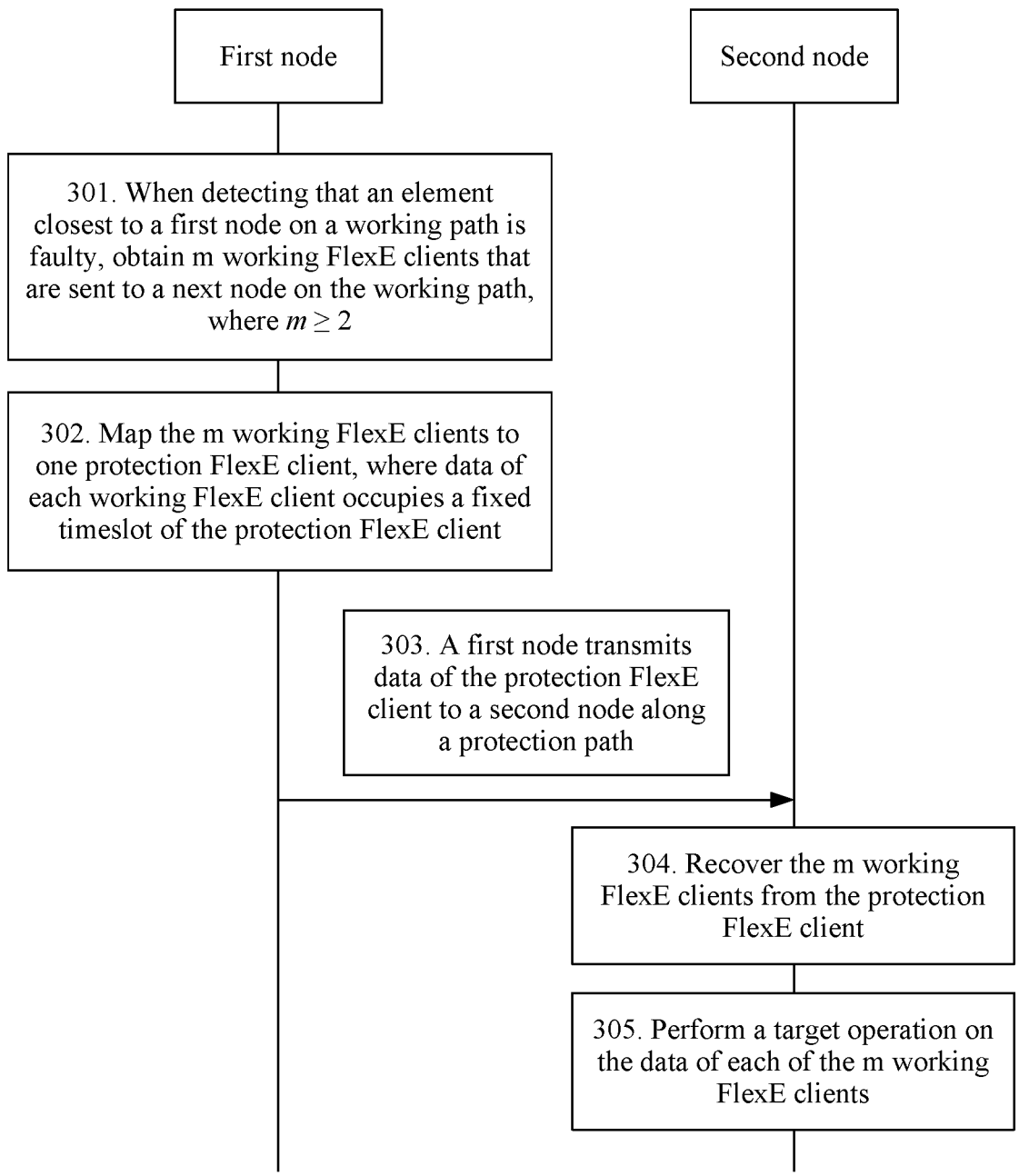
Figures 2, 3:
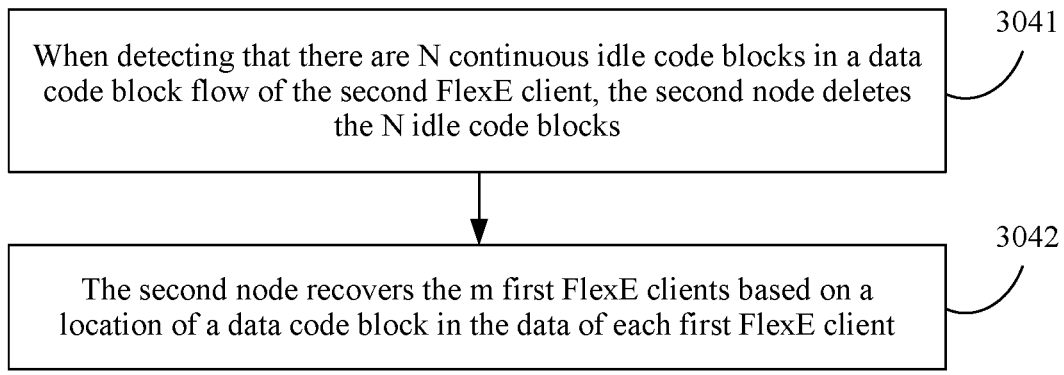
Figure 3:
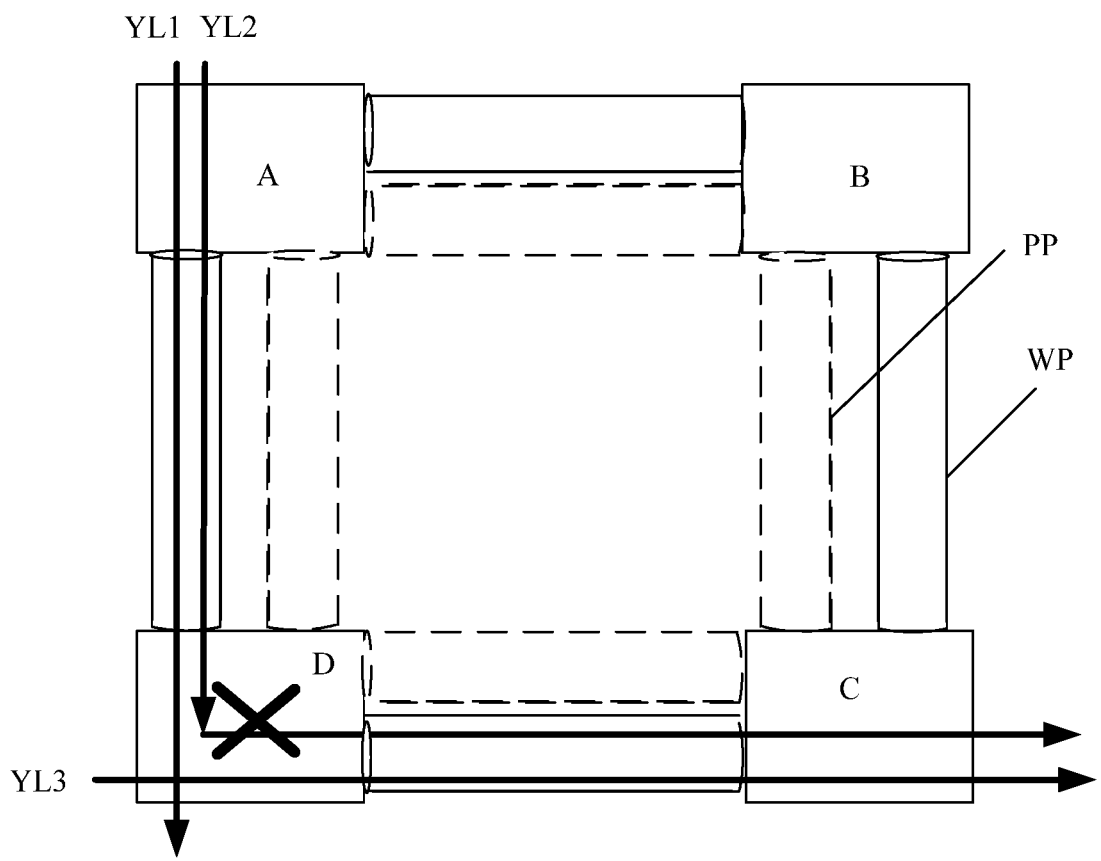
Figures 1, 4:
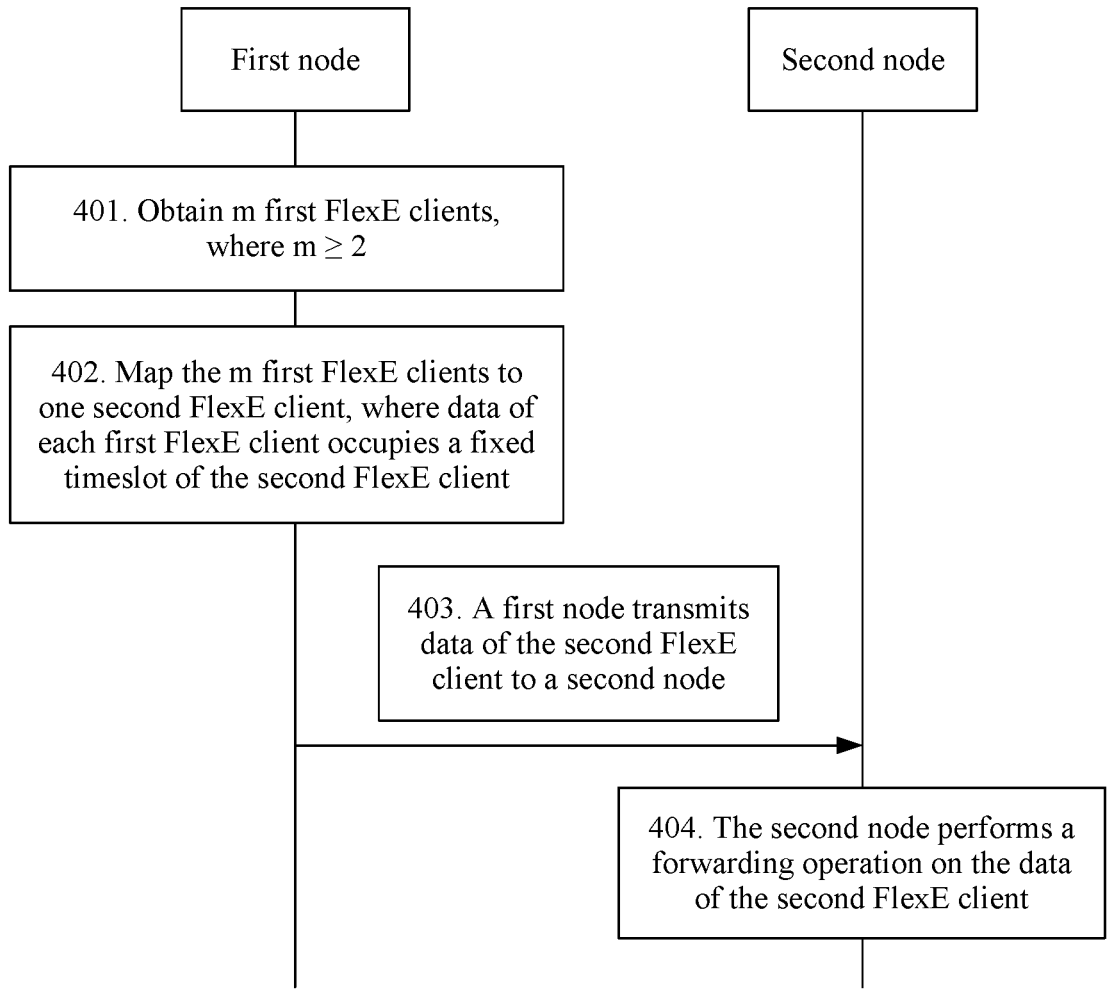
Figures 2, 4:
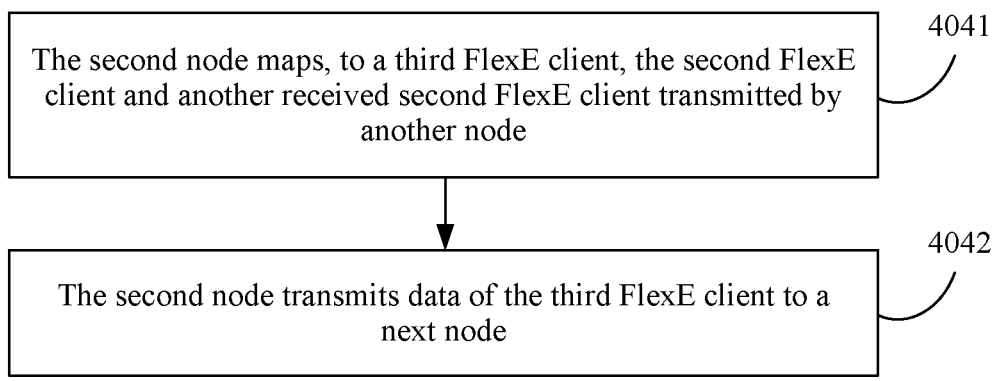
Figures 1, 5:
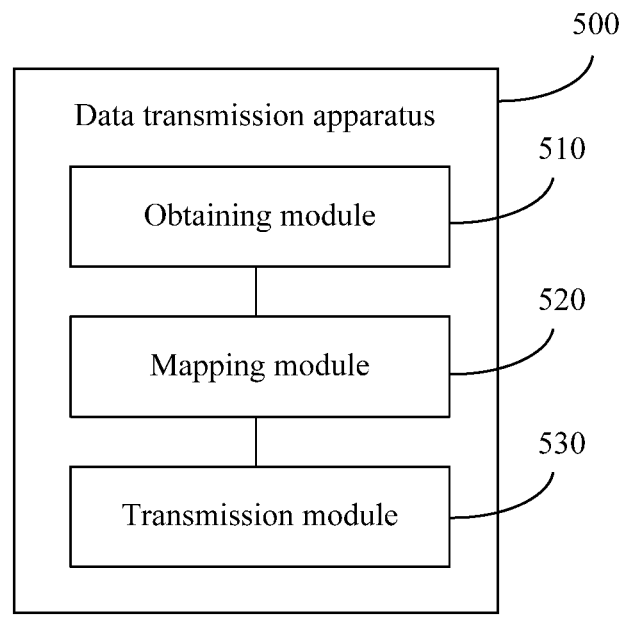
Figures 2, 5:
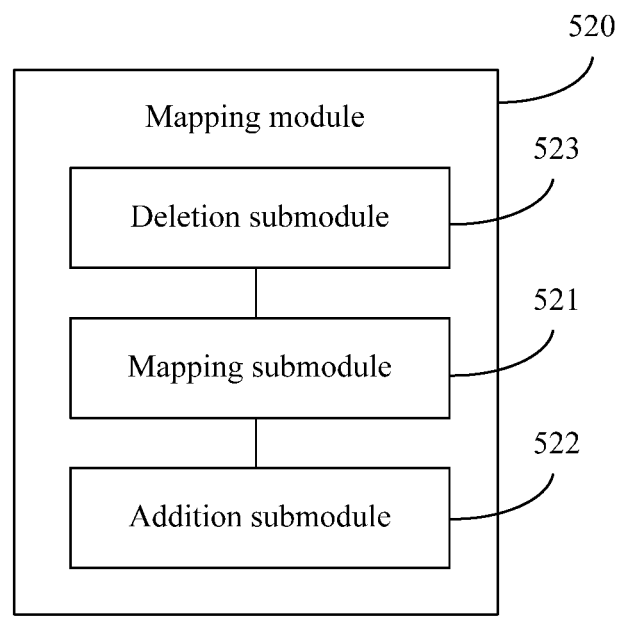
Figures 3, 5:
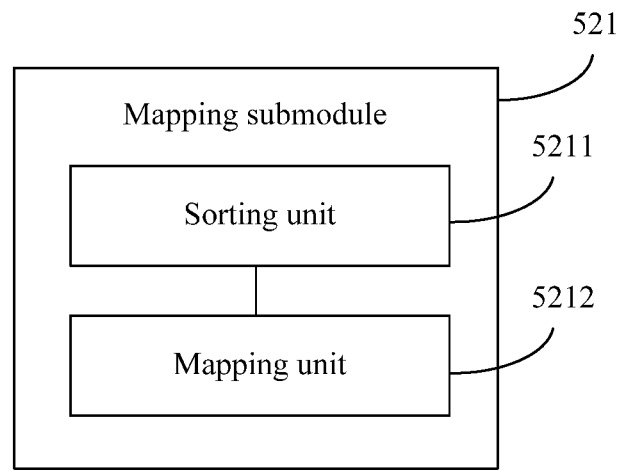
Figures 1, 6:
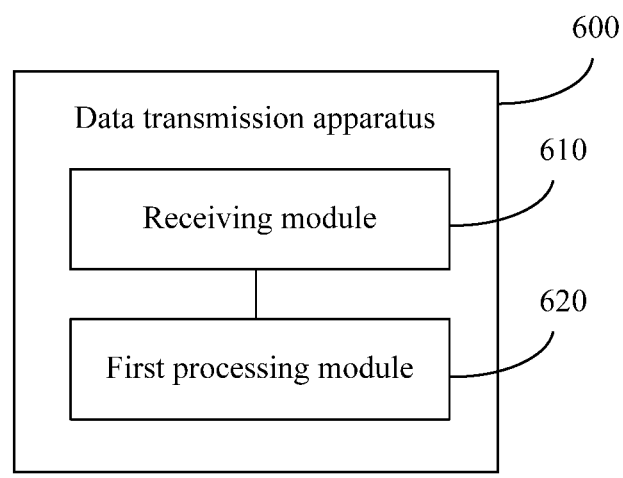
Figures 2, 6:
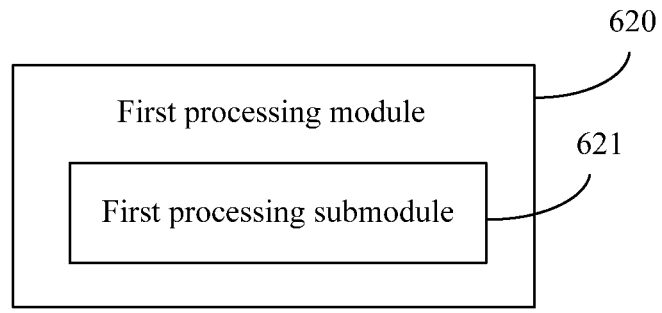
Figures 3, 6:
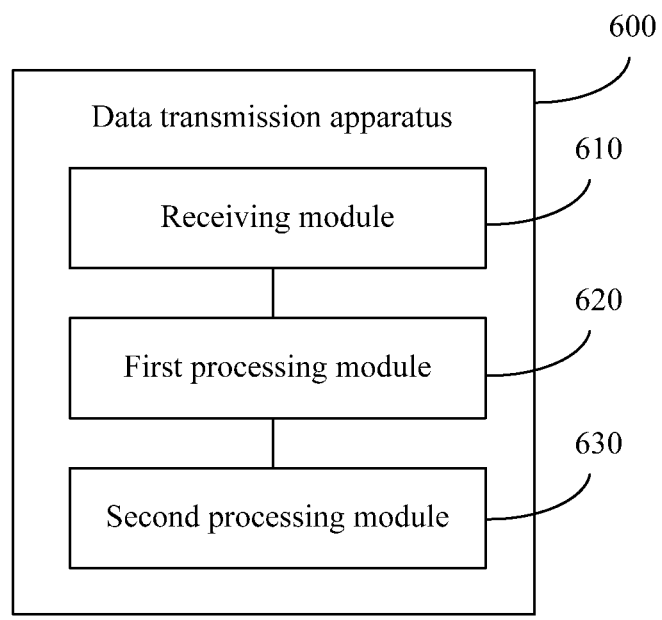
Figures 4, 6:
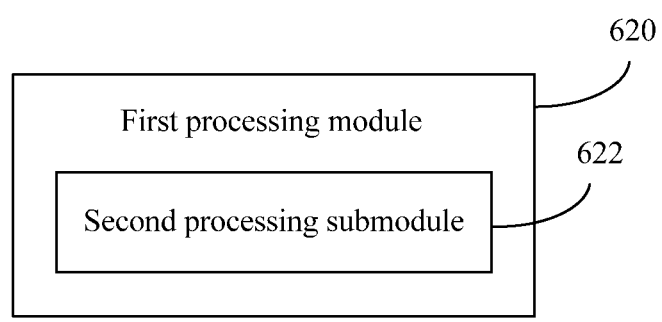
Figure 7:
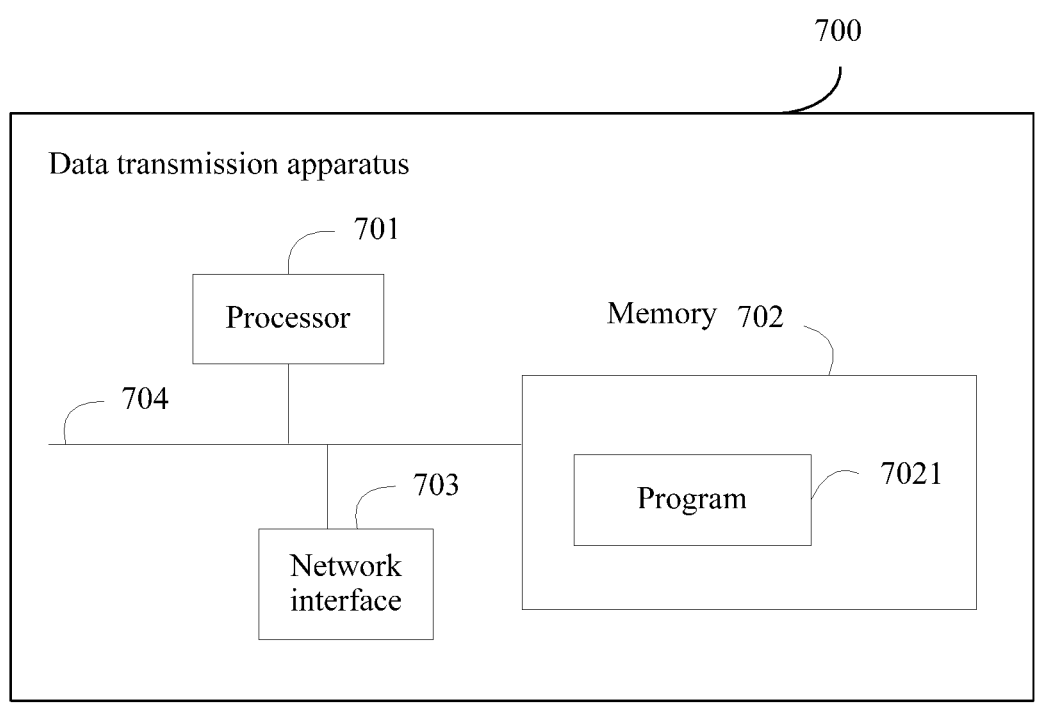

FIG. 7 is a schematic structural diagram of a data transmission apparatus 700 according to an embodiment of the present disclosure. The data transmission apparatus may be applied to the first node in the implementation environment shown in FIG. 1-1. As shown in FIG. 7, the data transmission apparatus 700 includes a processor 701 (such as a CPU), a memory 702, a network interface 703, and a bus 704. The bus 704 is configured to connect the processor 701, the memory 702, and the network interface 703. The memory 702 may include a random access memory (Random Access Memory, RAM), or may include a non-volatile memory (non-volatile memory) such as at least one magnetic disk memory. A communicative connection between the first node and another node is implemented by using the network interface 703 (which may be wired or wireless). The memory 702 stores a program 7021, and the program 7021 is used to implement various application functions. The processor 701 is configured to execute the program 7021 stored in the memory 702, to cooperatively implement the data transmission method shown in FIG. 2-1, FIG. 3-1, or FIG. 4-1.

An embodiment of the present disclosure further provides a data transmission apparatus. The data transmission apparatus may be applied to the second node in the implementation environment shown in FIG. 1-1. Referring to FIG. 7, the data transmission apparatus includes a processor (such as a CPU), a memory, a network interface, and a bus. The bus is configured to connect the processor, the memory, and the network interface. The memory may include a random access memory, or may include a non-volatile memory such as at least one magnetic disk memory. A communicative connection between a first node and the second node is implemented by using the network interface (which may be wired or wireless). The memory stores a program, and the program is used to implement various application functions. The processor is configured to execute the program stored in the memory, to cooperatively implement the data transmission method shown in FIG. 2-1, FIG. 3-1, or FIG. 4-1.

An embodiment of the present disclosure further provides a data transmission system, including a first node and a second node.

The first node may include the data transmission apparatus shown in FIG. 5-1, and the second node may include the data transmission apparatus shown in FIG. 6-1 or FIG. 6-3.

Alternatively, the first node includes the data transmission apparatus shown in FIG. 7, and the second node includes the data transmission apparatus shown in FIG. 7.

It may be clearly understood by a person skilled in the art that, for the purpose of convenient and brief description, for a detailed working process of the foregoing system, apparatus, and module, reference may be made to a corresponding process in the foregoing method embodiments, and details are not further described herein.

All or some of the foregoing embodiments may be implemented by using software, hardware, firmware, or any combination thereof. When the present disclosure is implemented by using software, all or a part of the present disclosure may be implemented in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid state disk), or the like.

In the several embodiments provided in this disclosure, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

A person of ordinary skill in the art may understand that all or some of the blocks of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this disclosure, but are not intended to limit this disclosure. Any modification, equivalent replacement, or improvement made without departing from the spirit and principle of this disclosure should fall within the protection scope of this disclosure.

What is claimed is:

1. A method, performed by a first node, the method comprising:
   obtaining m first FlexE clients, wherein $m \geq 2$;
   mapping the m first FlexE clients to a second FlexE client by mapping a data code block in data of each of the m first FlexE clients to a specified timeslot of the second FlexE client, to obtain a data code block flow of the second FlexE client, and continuously adding N idle code blocks to the data code block flow of the second FlexE client, wherein N is an integer multiple of a quantity of timeslots of the second FlexE client, wherein the data of each first FlexE client occupies a fixed timeslot of the second FlexE client; and
   transmitting data of the second FlexE client to a second node, wherein the second node is different from the first node.

2. The method of claim 1, wherein mapping the data code block in the data of each of the m first FlexE clients to the specified timeslot of the second FlexE client comprises:
   sorting the m first FlexE clients in a preset sorting manner; and
   mapping the data code block in the data of each of the m first FlexE clients to the specified timeslot of the second FlexE client in a sorting order.

3. The method of claim 2, wherein sorting the m first FlexE clients in the preset sorting manner comprises:
   sorting the m first FlexE clients based on content of a flow label corresponding to each of the m first FlexE clients.

4. The method of claim 3, wherein the flow label corresponding to each first FlexE client comprises an ingress node of the first FlexE client, an egress node of the first FlexE client, and a flow identifier of the first FlexE client; and
   different nodes are provided with a same flow identifier of the first FlexE client.

5. The method of claim 1, wherein before mapping the data code block in the data of each of the m first FlexE clients to a specified timeslot of the second FlexE client, the method further comprises:
   deleting q idle code blocks from data of p first FlexE clients, wherein $1 \leq p \leq m$ and $q \geq 1$.

6. The method of claim 1, wherein transmitting data of the second FlexE client to the second node comprises:
   sending the data of the second FlexE client to a third node;
   when detecting that there are N continuous idle code blocks in a data code block flow of the second FlexE client, deleting, by the third node, the N idle code blocks, wherein the third node is a node between the first node and the second node when the data of the second FlexE client is transmitted; and
   when transmitting a processed second FlexE client to the second node, continuously adding, by the third node, the N idle code blocks to a data code block flow of the processed second FlexE client.

7. The method of claim 1, wherein the first node and the second node are nodes in a flexible Ethernet FlexE ring network, the FlexE ring network comprises a plurality of nodes, the plurality of nodes form a working path and a protection path, both the working path and the protection path are two-way transmission paths, the first FlexE client is a working FlexE client, and the second FlexE client is a protection FlexE client; and
   obtaining m first FlexE clients comprises:
   in response to detecting that an element closest to the first node on the working path is faulty, obtaining the m working FlexE clients that are to be sent to a next node on the working path, wherein the element is a node or a link.

8. The method of claim 7, wherein transmitting data of the second FlexE client to the second node comprises:
   transmitting the data of the protection FlexE client to the second node along the protection path, wherein the second node is a node close to the faulty element.

9. The method of claim 1, wherein the first node and the second node are nodes in a FlexE-based hierarchical network.

10. A method performed by a second node, the method comprising:
    receiving data of a second FlexE client that is transmitted by a first node, wherein the second FlexE client is obtained after the first node maps m obtained first FlexE clients, data of each first FlexE client occupies a fixed timeslot of the second FlexE client, the first node is different from the second node, and $m \geq 2$; and
    performing a forwarding operation or a recovery operation on the data of the second FlexE client, wherein the first node maps the m obtained first FlexE clients by mapping a data code block in the data of each of the m first FlexE clients to a specified timeslot of the second FlexE client, to obtain a data code block flow of the second FlexE client and continuously adding N idle code blocks to the data code block flow of the second FlexE client, wherein N is an integer multiple of a quantity of timeslots of the second FlexE client.

11. The method of claim 10, wherein the first node and the second node are nodes in a flexible Ethernet FlexE ring network, the FlexE ring network comprises a plurality of nodes, the plurality of nodes form a working path and a protection path, both the working path and the protection path are two-way transmission paths, the first FlexE client is a working FlexE client, and the second FlexE client is a protection FlexE client;
receiving data of the second FlexE client that is transmitted by a first node comprises:
receiving the data of the protection FlexE client that is transmitted by the first node along the protection path, wherein the protection FlexE client is obtained after the first node maps the m working FlexE clients that are to be sent to a next node on the working path when detecting that an element closest to the first node on the working path is faulty, and the element is a node or a link;
performing the forwarding operation or a recovery operation on the data of the second FlexE client comprises:
recovering the m working FlexE clients from the protection FlexE client; and
after the recovering the protection FlexE client to the m working FlexE clients, the method further comprises:
performing a target operation on the data of each of the m working FlexE clients, wherein the target operation is a forwarding operation or a discarding operation.

12. The method of claim 11, wherein recovering the m working FlexE clients from the protection FlexE client comprises:
in response to detecting that there are N continuous idle code blocks in a data code block flow of the protection FlexE client, deleting the N idle code blocks, wherein N is an integer multiple of a quantity of timeslots of the protection FlexE client; and
recovering the m working FlexE clients based on a location of a data code block in the data of each working FlexE client.

13. The method of claim 11, wherein performing a target operation on the data of each of the m working FlexE clients comprises:
for each of the working FlexE clients:
when it is detected, based on a flow label corresponding to the working FlexE client, that the data of the working FlexE client does not pass through the second node, performing the discarding operation on the data of the working FlexE client; or
in response to detecting, based on a flow label corresponding to the working FlexE client, that the data of the working FlexE client passes through the second node, performing the forwarding operation on the data of the working FlexE client, wherein the flow label corresponding to the working FlexE client is used to indicate a forwarding path of the data of the working FlexE client on the working path.

14. The method of claim 13, wherein the flow label corresponding to the working FlexE client comprises:
an ingress node of the working FlexE client, an egress node of the working FlexE client, and a flow identifier of the working FlexE client; and
different nodes are provided with a same flow identifier of the working FlexE client.

15. The method of claim 10, wherein the first node and the second node are nodes in a FlexE-based hierarchical network;
performing the forwarding operation or a recovery operation on the data of the second FlexE client comprises:
performing the forwarding operation on the data of the second FlexE client; and
performing the forwarding operation on the data of the second FlexE client comprises:
mapping, to a third FlexE client, the second FlexE client and another received second FlexE client transmitted by another node, wherein the another second FlexE client is obtained after the another node maps the m obtained first FlexE clients, and the data of the second FlexE client and data of the another second FlexE client each occupy a fixed timeslot of the third FlexE client; and
transmitting data of the third FlexE client to a next node.

16. A data transmission apparatus, applied to a first node, wherein the apparatus comprises:
an obtaining module, configured to obtain m first FlexE clients, wherein $m \geq 2$;
a mapping module, configured to map the m first FlexE clients to one second FlexE client by:
map a data code block in data of each of the m first FlexE clients to a specified timeslot of the second FlexE client, to obtain a data code block flow of the second FlexE client and
an addition submodule, configured to continuously add N idle code blocks to the data code block flow of the second FlexE client, wherein N is an integer multiple of a quantity of timeslots of the second FlexE client, wherein the data of each first FlexE client occupies a fixed timeslot of the second FlexE client; and
a transmission module, configured to transmit data of the second FlexE client to a second node, wherein the second node is different from the first node.

17. The apparatus of claim 16, wherein the mapping module comprises:
a sorting unit, configured to sort the m first FlexE clients in a preset sorting manner; and
a mapping unit, configured to map the data code block in the data of each of them first FlexE clients to the specified timeslot of the second FlexE client in a sorting order.

18. The apparatus of claim 17, wherein the sorting unit is configured to:
sort the m first FlexE clients based on content of a flow label corresponding to each of the m first FlexE clients.

* * * * *

UNITED STATES PATENT AND TRADEMARK OFFICE
CERTIFICATE OF CORRECTION

PATENT NO. : 11,297,000 B2
APPLICATION NO. : 16/832795
DATED : April 5, 2022
INVENTOR(S) : Jing Huang et al.

It is certified that error appears in the above-identified patent and that said Letters Patent is hereby corrected as shown below:

In the Claims

Claim 17, Column 34, Line 53, delete "of them first" and insert --of the m first--.

Signed and Sealed this
Fifth Day of July, 2022

Katherine Kelly Vidal
*Director of the United States Patent and Trademark Office*